US008415610B2

(12) United States Patent
Nakajima et al.

(10) Patent No.: US 8,415,610 B2
(45) Date of Patent: Apr. 9, 2013

(54) OPTICAL ENCODER HAVING A SINGLE SIGNAL TRACK AND AN OPTICAL DETECTING PART WITH SINE AND COSINE SIGNALS

(75) Inventors: Hajime Nakajima, Tokyo (JP); Takuya Noguchi, Tokyo (JP); Takeshi Musha, Tokyo (JP); Youichi Omura, Tokyo (JP); Toshiro Nakashima, Tokyo (JP); Tatsuya Nagatani, Tokyo (JP); Takashi Iwamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/990,508

(22) PCT Filed: Jun. 3, 2009

(86) PCT No.: PCT/JP2009/060108
§ 371 (c)(1),
(2), (4) Date: Nov. 1, 2010

(87) PCT Pub. No.: WO2009/148066
PCT Pub. Date: Dec. 10, 2009

(65) Prior Publication Data
US 2011/0049341 A1      Mar. 3, 2011

(30) Foreign Application Priority Data

Jun. 5, 2008 (JP) .................................. 2008-148063
Nov. 18, 2008 (JP) .................................. 2008-294189

(51) Int. Cl.
*G01D 5/34*          (2006.01)

(52) U.S. Cl. .............................. 250/231.13; 250/231.16

(58) Field of Classification Search ............. 250/231.13, 250/231.16, 231.18, 239; 341/9–14
See application file for complete search history.

(56) References Cited

U.S. PATENT DOCUMENTS 3,441,350 A * 4/1969 Rantsch et al. ............... 356/396
5,537,210 A   7/1996 Kaneda et al.
(Continued)

FOREIGN PATENT DOCUMENTS

DE    198 10 282 A1    2/1999
DE    694 18 819 T2    3/2000
(Continued)

OTHER PUBLICATIONS

International Search Report issued Jul. 7, 2009 in PCT/JP09/060108 filed Jun. 3, 2009.

(Continued)

*Primary Examiner* — Que T Le
(74) *Attorney, Agent, or Firm* — Oblon, Spivak, McClelland, Maier & Neustadt, L.L.P.

(57) ABSTRACT

Present invention provides an optical encoder capable of improving the precision of an interpolation angle in a single signal track, in an encoder of sine-wave angle interpolation type. The optical encoder includes a waveform, in which a phase-modulated wave is superimposed in a predetermined period over a sine-wave of a fundamental period, as a signal track (103), and an optical detector (104) for extracting the sine signal and the cosine signal of the phase-modulated wave. An operation unit (106) operates electric angles individually from the output signals of a first optical detector pair and a second optical detector pair belonging to the optical detector, and determines the sum and difference of the electric angles, thereby acquiring the electric angle and the phase-modulated wave of the fundamental period.

9 Claims, 11 Drawing Sheets

U.S. PATENT DOCUMENTS

| | | | |
|---|---|---|---|
| 6,054,938 A | 4/2000 | Nakajima et al. | |
| 7,291,832 B2 | 11/2007 | Muenter | |
| 2007/0034786 A1 | 2/2007 | Oka et al. | |
| 2007/0187581 A1 | 8/2007 | Ohmura et al. | |

FOREIGN PATENT DOCUMENTS

| | | |
|---|---|---|
| DE | 11 2004 002 244 T5 | 9/2006 |
| EP | 0 651 232 A1 | 5/1995 |
| JP | 59 226822 | 12/1984 |
| JP | 61 182522 | 8/1986 |
| JP | 8 61990 | 3/1996 |
| JP | 8 184466 | 7/1996 |
| JP | 8 304112 | 11/1996 |
| JP | 8 304113 | 11/1996 |
| JP | 11-37801 | 2/1999 |

OTHER PUBLICATIONS

Office Action issued Apr. 26, 2012 in German Application No. 11 2009 001 319.8 (With English Translation).

* cited by examiner

OPTICAL ENCODER HAVING A SINGLE SIGNAL TRACK AND AN OPTICAL DETECTING PART WITH SINE AND COSINE SIGNALS

TECHNICAL FIELD

The present invention relates to an optical encoder including a light source, a signal track arranged on a subject of measurement, and light receiving elements, and that determines a displacement of the subject of measurement by performing operation of the outputs of the light receiving elements.

BACKGROUND ART

In the aforementioned optical encoder, conventionally, for example, the signal track is formed so that an amount of penetrating light or an amount of reflected light, obtained by the light receiving elements from the light source via the signal track, is changed sinusoidally. In addition, the optical encoder includes a configuration in which each light receiving element is arranged at a position that is offset by ¼ of a pitch in the sinusoidal change in the amount of light. According to this configuration, signals being displaced by a 90° phase from each other can be obtained from the light receiving elements, and it becomes able to divide one period of the signal that is obtained from a pattern of the signal track into a plurality of segments (e.g., see patent document 1).

Furthermore, in an optical encoder having a plurality of diffraction gratings, in order to remove a harmonic distortion from an output signal, there is a type of the optical encoder in which the diffraction grating does not have a pattern with an interval between adjacent patterns being constant, and has a pattern with a predetermined phase difference with respect to a pattern of a reference phase and has a pattern having a phase difference that corresponds to a combination of a sum of each phase difference (e.g., see patent document 2).

Moreover, a technique of a Vernier encoder, which includes a main slit track having a predetermined wavenumber and a sub slit track having a wavenumber that is smaller than the predetermined wavenumber of the main slit track by a particular wavenumber, and generates a long period signal from a difference in an electrical angle between the aforementioned two tracks, is also suggested (e.g., see patent document 3).

PRIOR ART DOCUMENTS

Patent Documents

Patent document 1: Unexamined Japanese Patent Application Publication No. S61-182522,
Patent document 2: Unexamined Japanese Patent Application Publication No. H08-184466, and
Patent document 3: Unexamined Japanese Patent Application Publication No. H08-304113.

SUMMARY OF THE INVENTION

Problem to be Solved by the Invention

In the optical encoder, in a detection utilizing a sine wave angle interpolation, a precision of the interpolation is restricted by a circuit that detects a value of the sine wave. Hence, in a case where an absolute value detection requiring high resolution is to be performed, a plurality of signal tracks must be arranged on a subject of measurement, and angular positions of the interpolation must be configured as sequentially connected. Hence, there is a problem that an area of a scale for arranging the signal tracks becomes large.

Furthermore, although the suggestion of changing the pattern interval as stated above has been made, in an aim to improve the resolution of the sine wave angle interpolation, conventionally there never has been a technique that gives consideration even to a positioning of the light receiving elements as well as a technique for operating the output signal.

The present invention has been made to resolve the above stated problems, and aims to provide an optical encoder that is capable of improving the precision of interpolation angle in a single signal track.

Means for Solving the Problem

In order to achieve the above aim, the present invention is configured as follows.

That is, an optical encoder of a first aspect of the present invention includes a light source; a single signal track arranged on a subject of measurement and configured to modulate a luminous flux from the light source in accordance with a movement of the subject of measurement; an optical detecting part configured to receive the luminous flux from the signal track and convert the luminous flux to an electrical signal, and output the electrical signal; and an operating unit configured to operate the output signal of the optical detector. Furthermore the optical encoder is characterized in that: the signal track includes a configuration configured to sinusoidally modulate an intensity of the light from the light source and give the sine-wave a phase modulation which is repeated for every $m\lambda=\Lambda$ (the m being a natural number), where the $\lambda$ is a fundamental period; the optical detecting part is configured to extract a sine signal and a cosine signal from the luminous flux modulated sinusoidally by the signal track giving the phase modulation; and by the operating unit, signals with two periods from the single signal track are obtained, one of which is a fundamental period signal with the fundamental period $\lambda$ and the other is a phase-modulated signal with the period $\Lambda$.

In the first aspect, the optical detecting part may be configured to position a first optical detector pair consisting of a pair of optical detectors configured to extract a sine signal and a cosine signal from the luminous flux modulated sinusoidally by the signal track and a second optical detector pair consisting of a pair of optical detectors configured to extract the sine signal and the cosine signal from the luminous flux modulated sinusoidally by the signal track, at respective positions that are apart by a period of $\{(2n+1)\Lambda/2\}$ with respect to the period $\Lambda$ of the phase modulation. The operating unit may be configured to: operate an electric angle at a position of each of the first optical detector pair and the second optical detector pair from the sine signals and the cosine signals outputted from the first optical detector pair and the second optical detector pair; operate an electric angle in the fundamental period $\lambda$ by adding each of the obtained electric angles; and operate a first phase-modulated signal by determining a difference between the obtained electric angles.

In the first aspect, the optical detecting part may further include a third optical detector pair and a fourth optical detector pair, which are positioned at respective positions that are apart by a period of $\{(2n+1)\Lambda/4\}$ from the first optical detector pair and the second optical detector pair respectively, and have the same configuration as the first optical detector pair and the second optical detector pair. The operating unit may be configured to operate an electric angle of the phase-modulated signal from the first phase-modulated signal that is obtained from the first optical detector pair and the second optical detector pair and a second phase-modulated signal that is obtained from the third optical detector pair and the fourth optical detector pair.

In the first aspect, the optical detecting part may position a first optical detector pair consisting of a pair of optical detectors configured to extract the sine signal and the cosine signal from the luminous flux modulated sinusoidally by the signal track and a second optical detector pair consisting of a pair of optical detectors configured to extract the sine signal and the cosine signal from the luminous flux modulated sinusoidally by the signal track, at respective positions that are apart by a period of $\Lambda/2$ in the period $\Lambda$ of the phase modulation, and may further include a third optical detector pair and a fourth optical detector pair, which are positioned at respective positions that are apart by a period of $\Lambda/4$ from the first optical detector pair and the second optical detector pair respectively, and have the same configuration as the first optical detector pair and the second optical detector pair. The operating unit may be configured to operate an electric angle of a position of each optical detector pair from the sine signal and the cosine signal outputted respectively from the first optical detector pair and the second optical detector pair as well as the third optical detector pair and the fourth optical detector pair, operate an electric angle of the fundamental period $\lambda$ by adding each of the acquired electric angles, and operate a first phase-modulated signal by determining differences between the respective acquired electric angles.

In the first aspect, the operating unit may further be configured to operate an electric angle of a phase-modulated signal based on a difference between the first phase-modulated signal and the second phase-modulated signal, where the first phase-modulated signal is operated from the first optical detector pair and the second optical detector pair as well as the third optical detector pair and the fourth optical detector pair, and the second phase-modulated signal is operated from the second optical detector pair and the third optical detector pair as well as the fourth optical detector pair and the first optical detector pair.

In the first aspect, the subject of measurement may include, in addition to a first signal track which is the aforementioned signal track, a second signal track that is different from the first signal track. The optical detecting part may be arranged so as to correspond to each signal track. The first signal track may be a signal track that generates the phase-modulated sine wave. The second signal track may be a signal track that performs the sinusoidal light intensity modulation of a single period having a higher frequency than a resolution that can be processed by the first signal track.

In the first aspect, the subject of measurement may include, in addition to a first signal track which is the signal track, a second signal track that is different from the first signal track. The optical detecting part may be arranged so as to correspond to each signal track. The first signal track may be a signal track that generates the phase-modulated sine wave. The second signal track may be a signal track that performs the sinusoidal light intensity modulation of a single period having a lower frequency than a resolution that can be processed by the first signal track.

In the first aspect, the second signal track may be a signal track that performs the sinusoidal light intensity modulation of a single period, where a wavenumber n of the second signal track differs by a number j from a wavenumber L of the first signal track.

In the first aspect, a track radius of the first signal track may be $R(L/n)$, where a track radius of the second signal track is R.

An optical encoder of a second aspect of the present invention includes a light source; a scale including a first track and a second track that are arranged on a subject of measurement and that each of which is configured to modulate a luminous flux from the light source in accordance with a movement of the subject of measurement; an optical detecting part configured to receive the modulated luminous flux from the scale, convert the luminous flux to an electrical signal, and output the electrical signal; and an operating unit configured to operate a position of the subject of measurement by operating the output signal from the optical detector. Furthermore the optical encoder is characterized in that: the first track is configured by a fixed periodic pattern with a wavenumber n with respect to a period $\Lambda$ that divides the entire first track into k segments; the second track is configured to have a wavenumber that differs from the wavenumber n of the first track by a number m, and be phase-modulated by a function that changes in the period $\Lambda$; the optical detector is configured to include a first optical detector that is arranged corresponding to the first track and a plurality of optical detectors that are arranged corresponding to the second track and offset by a $\Lambda/4$ period from each other; and the operating unit is configured to determine a long period signal by operating a difference in operated outputs of electric angles that be determined from an output signal of the first optical detector and an output signal of the second optical detector, determine an absolute position within the period $\Lambda$ by operating a difference in operated outputs of electric angles that are determined from output signals of the second optical detector, and determine a vernier output that is repeated m times within the period $\Lambda$ by operating a sum of the operated outputs of electric angles.

The second aspect may further include a fixed grating that is fixedly arranged between the light source and the first and second tracks of the scale. The optical detecting part may be configured to detect a grating image that is generated by the fixed grating and the scale.

In the second aspect, each of the first track and the second track of the scale may have a phase grating which modulates the phase of light.

Advantages of the Invention

The optical encoder according to the first aspect of the present invention includes the optical detector facing to the single signal track and the operating unit, and from this optical detector, sine signals and cosine signals having a plurality of different periods can be obtained. That is, two periodic signals with different periods can be obtained from the single signal track. Hence, an effect of reducing the size of the scale having the signal track is achieved and the electric angle which can be interpolated in the single signal track can be determined from the aforementioned two periodic signals, thus improvement of the interpolation resolution compared to conventional ones can be made. Specifically, the electric angle which can be interpolated can be determined from the sum of the respective electric angles of the first optical detector pair and the second optical detector pair of the optical detector.

According to the optical encoder of the second aspect, by including the second track, the second optical detector, and the operating unit, sine wave outputs having a plurality of periods can be acquired from the second track. Thus, in the single track, the electric angle that can be interpolated is obtained by the sum of interpolated electric angles of the aforementioned plurality of periods, and thereby the resolution of the interpolation can be improved.

Moreover, as described above, since the sine wave outputs of the plurality of periods can be acquired from the single track, there is no need to provide a plurality of tracks; size reduction of the scale can also be achieved thereby.

BEST MODE FOR CARRYING OUT THE INVENTION

Optical encoders of embodiments in the present invention will be explained below with reference to the drawings. Note that in each of the drawings, same reference number is given to components that are identical or similar.

First Embodiment

Figure 1:
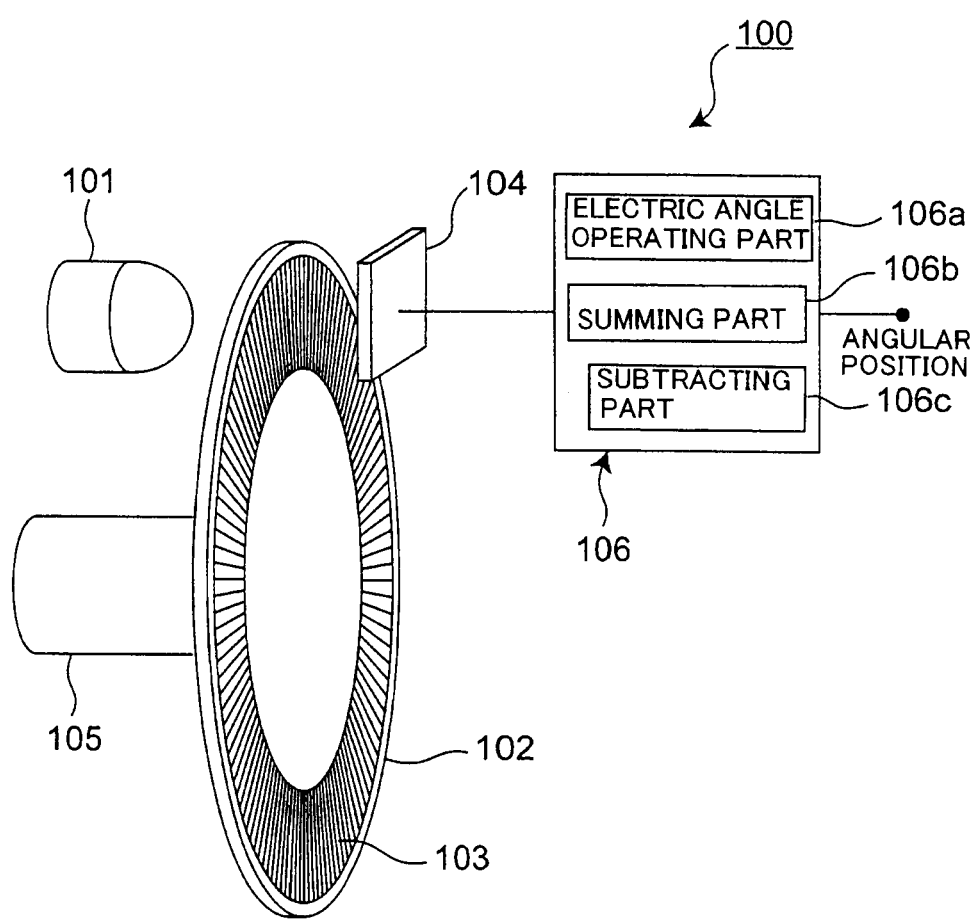
FIG. 1 is a perspective view of a configuration of an optical encoder of a first embodiment of the present invention.

FIG. 1 is a configuration diagram of an optical encoder 100 of the first embodiment in the present invention. The optical encoder 100 includes a light source 101, a scale 102, an optical detecting part 104, and an operating unit 106 to be connected to the optical detecting part 104.

As the light source 101, e.g., LED, LD, etc. can be used. The scale 102 is arranged between the light source 101 and the optical detecting part 104, is a disk that is attached to a rotating shaft 105 that is a subject of measurement in this first embodiment, and includes a single signal track 103 arranged along a circumference thereof for modulating a luminous flux from the light source 101. The signal track 103 is patterned so as to correspond to a rotation angle of the rotating shaft 105.

The optical detecting part 104 receives the luminous flux from the signal track 103, converts the same to an electric signal, and outputs the electric signal to the operating unit 106. Although details thereof will be described later, the operating unit 106 functionally includes an electric angle operating part 106a, a summing part 106b, and a subtracting part 106c, and operates and outputs the rotation angle or a rotating position of the scale 102, i.e., the rotating shaft 105.

In the first embodiment, as shown in the drawings and stated above, the optical encoder 100 employs an example of a rotary encoder, but is not limited to this example. The present invention may also be applied to an embodiment of a linear encoder. Further, in the first embodiment, the optical detecting part 104 detects the luminous flux of the light source 101 that has penetrated the signal track 103, however, the optical detecting part 104 is not limited to this example, and thus it may be configured to detect the reflected light.

Figure 2:
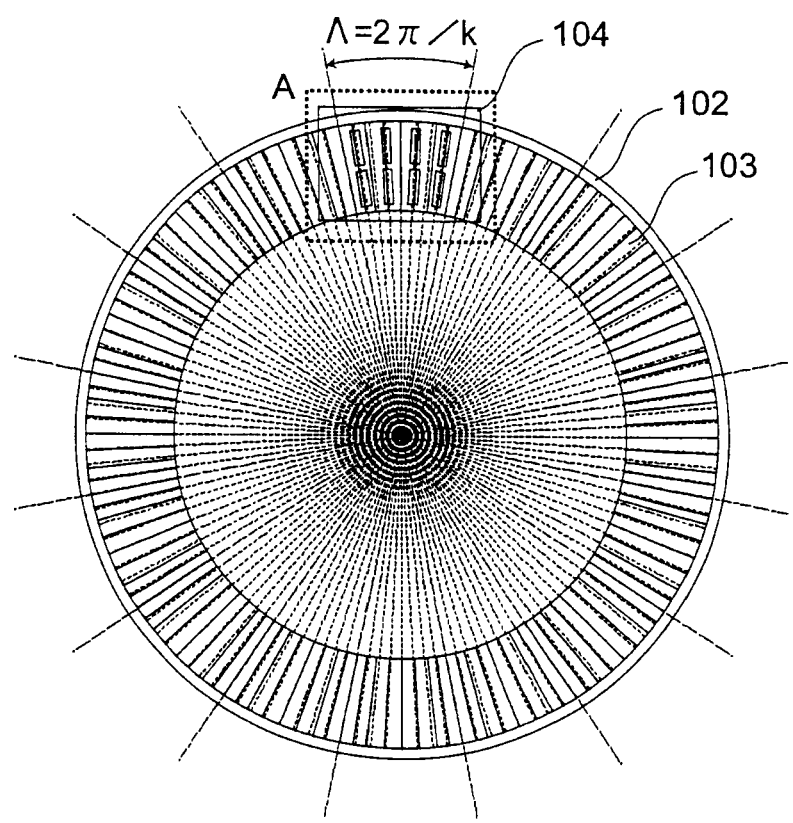
FIG. 2 is a plan view of a signal track of the optical encoder shown in FIG. 1.
Figure 3:
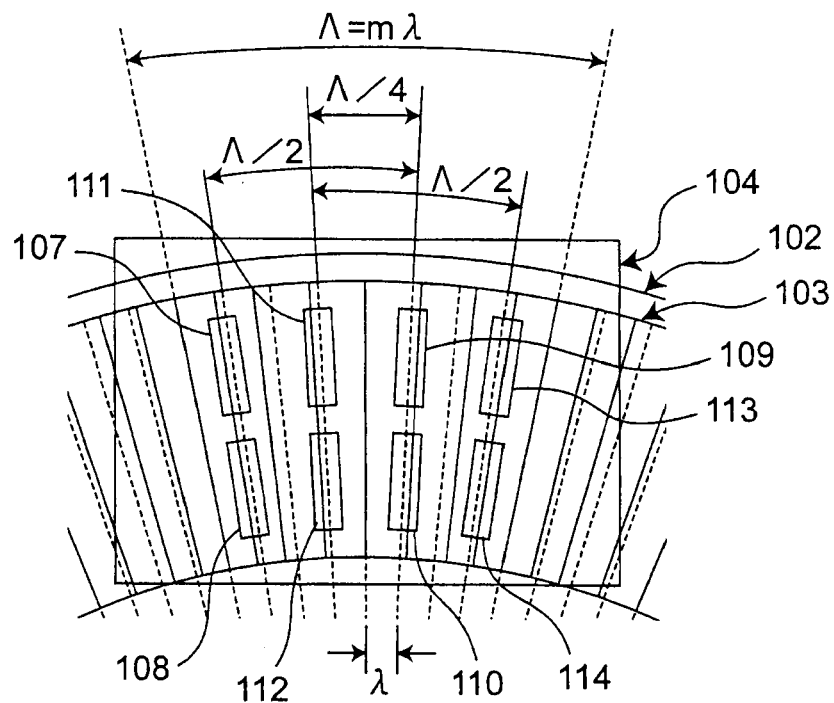
FIG. 3 is an enlarged view of the signal track shown in FIG. 2.
Figure 4:
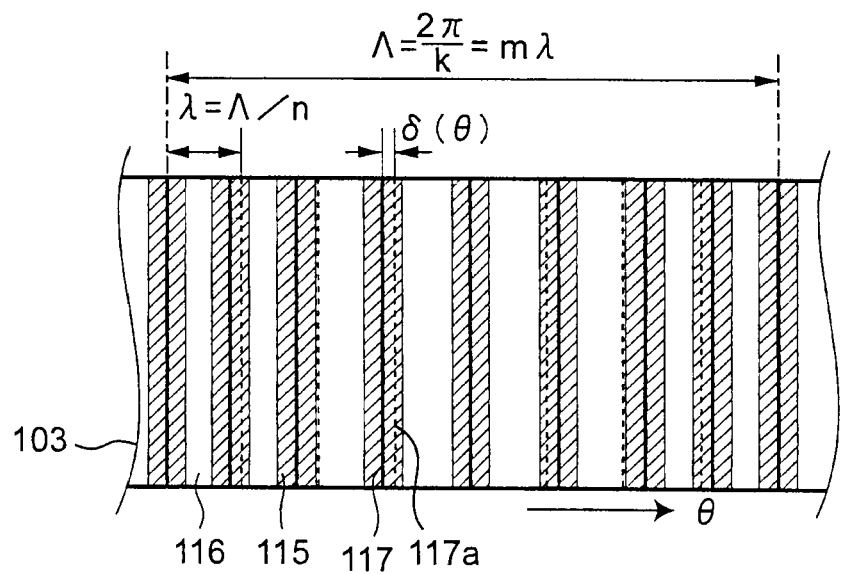
FIG. 4 is a linearly exploded view of the signal track shown in FIG. 2.

Further, FIG. 2 shows a configuration of the signal track 103 of the scale 102; and FIG. 3 shows an enlarged view of a region "A" indicated with broken line in FIG. 2. Further, FIG. 4 is a linearly exploded view of a pattern of the signal track 103 of FIG. 3 for the sake of easier understanding.

The pattern in the signal track 103 gives a sinusoidal modulation to the light from the light source 101. A dark section (shaded area) 115 and a bright section 116 for the modulation are alternately formed as the pattern of the signal track 103, and the pattern makes a phase modulation that is repeated in every period of $\Lambda=m\lambda$ (the "m" being a natural number) with a fundamental period $\lambda$. Moreover, the period $\Lambda$ of the phase modulation is an angle that divides a circumference of the signal track 103 into k equal segments. In the present embodiment, it is assumed k=16 and m=8.

As shown in FIG. 2 and FIG. 3, the optical detecting part 104 includes optical detectors 107 to 114. The optical detectors 107 to 114 are arranged to face to the single signal track 103. Further, the optical detectors 107, 109, 111, and 113 are arranged along a circumferential direction of the scale on the same radius at an outer circumference side of the scale 102, and output sine waves with phase-modulated waveform as will be described later in detail. The optical detectors 108, 110, 112, and 114 are arranged along the circumferential direction on the same radius at an inner circumference side of the scale 102 with respect to the optical detectors 107, 109, 111, and 113, and output cosine waves with phase-modulated waveform as will be described later in detail. Moreover, each of pairs of the optical detector 107 and the optical detector 108, the optical detector 109 and the optical detector 110, the optical detector 111 and the optical detector 112, and the optical detector 113 and the optical detector 114 is arranged along a diameter of the scale 102 that is different from diameters of other pairs. Further, the optical detector 107 and the optical detector 108 configure a first optical detector pair, the optical detector 109 and the optical detector 110 configure a second optical detector pair, the optical detector 111 and the optical detector 112 configure a third optical detector pair, and the optical detector 113 and the optical detector 114 configure a fourth optical detector pair.

With respect to the pattern of the signal track 103 formed as above, as shown in FIG. 3, in the present embodiment, the first optical detector pair including the optical detector 107 and the optical detector 108 and the second optical detector pair including the optical detector 109 and the optical detector 110 are arranged at respective positions that are apart by a period of $\Lambda/2$ (generally a period of $\{(2n+1) \Lambda/2\}$, (where n being an integer equal to or larger than zero)). Similarly, the third optical detector pair including the optical detector 111 and the optical detector 112 and the fourth optical detector pair including the optical detector 113 and the optical detector 114 are arranged at respective positions that are apart by the period of $\Lambda/2$ (generally the period of $\{(2n+1) \Lambda/2\}$). Further, the first optical detector pair and the third optical detector pair, the third optical detector pair and the second optical detector pair, as well as the second optical detector pair and the fourth optical detector pair are respectively arranged at positions that are apart by a period of $\Lambda/4$ (generally a period of $\{(2n+1) \Lambda/4\}$).

Figure 5:
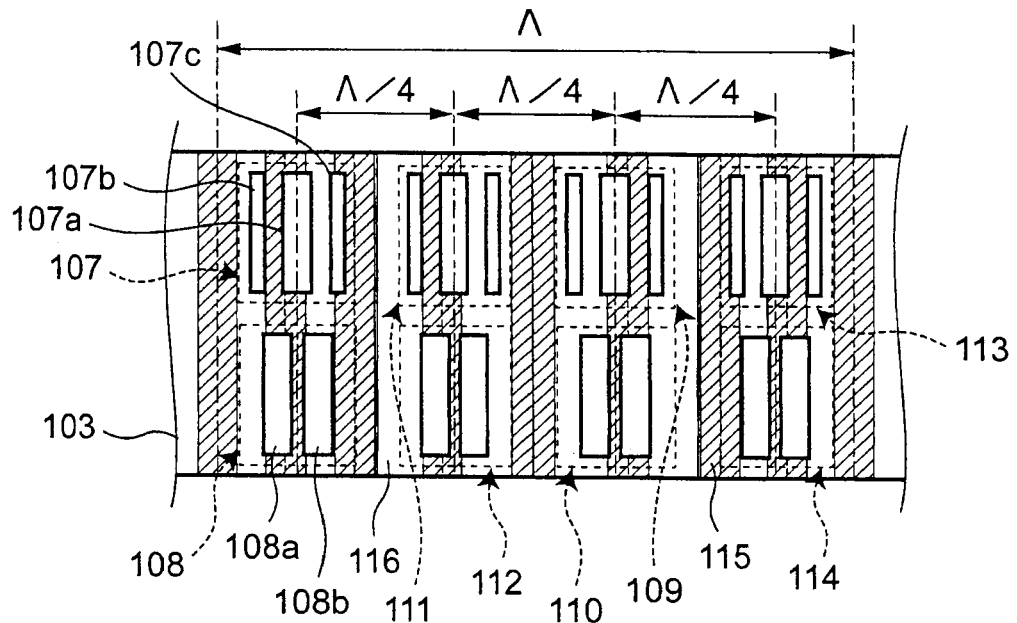
FIG. 5 is a view for explaining a configuration of an optical detector included in the optical encoder shown in FIG. 1, and is a linearly exploded view of the optical detector.

Moreover, the optical detectors 107 to 114 are configured as shown in FIG. 5. Note that FIG. 5 corresponding to the diagrammatic representation in FIG. 4 shows each of the optical detectors shown in FIG. 3 in a state where the optical detectors are arranged linearly. The optical detector 107 and the optical detector 108 forming the first optical detector pair will be explained as an example hereinbelow. The optical detector 107 includes sub detectors 107a, 107b, and 107c, and the optical detector 108 includes sub detectors 108a and 108b. The sub detectors 107b and 107c are each formed having ½ of an area of the sub detector 107a, and are arranged, with the sub detector 107a being interposed therebetween, at positions that are displaced by ½ of the fundamental period $\lambda$ with respect to the sub detector 107a. The sub detector 108a and the sub detector 108b have the same amount of area, and are arranged at positions displaced by ½ of the fundamental period $\lambda$. Further, the sub detector 107a and, the sub detectors 108a and 108b are arranged with a displacement of ¼ of the fundamental period $\lambda$ given thereto. Other optical detectors, i.e., the optical detector 109 and the optical detector 110 configuring the second optical detector pair, the optical detector 111 and the optical detector 112 configuring the third optical detector pair, and the optical detector 113 and the optical detector 114 configuring the fourth optical detector pair, are also formed with a configuration similar to that of the first optical detector pair.

Performance of the optical encoder 100 of the first embodiment having the aforementioned configuration will be described below.

As stated above, in the signal pattern of the signal track 103 to which the phase modulation that is repeated for every period of $\Lambda=m\lambda$ with the fundamental period $\lambda$ is given, an electric angle origin 117 (FIG. 4) of the phase-modulated pattern is displaced by $\delta(\theta)$ with respect to an electric angle origin 117a of the fundamental period $\lambda$ shown with a broken line, in accordance with the phase modulation. For example, a waveform $f[\theta]$ and a waveform $\delta[\theta]$ of the phase modulated pattern may be given by intensity modulation as below:

[Formula 1]

$$f[\theta] = 1 + \alpha \sin\left[2\pi \frac{\theta}{\lambda} + \delta(\theta)\right] \quad (1)$$

[Formula 2]

$$\delta[\theta] = \beta \sin\left[2\pi \frac{\theta}{\Lambda}\right] = \beta \sin\left[2\pi \frac{\theta}{m\lambda}\right] \quad (2)$$

Furthermore, as mentioned above with reference to FIG. 5, in the state where e.g. the sub detectors 107a, 107b, 107c configuring the optical detector 107 are arranged at predetermined positions and the sub detectors 108a, 108b configuring the optical detector 108 are arranged at predetermined positions, with the center of the sub detector 107a being a reference point, an output $f7a[\theta]$ of the sub detector 107a is given by:

[Formula 3]

$$f_{7a}[\theta] = 1 + \alpha \sin\left[2\pi \frac{\theta}{\lambda} + \delta(\theta)\right] = 1 + \alpha \sin\left[2\pi \frac{\theta}{\lambda} + \beta \sin\left(2\pi \frac{\theta}{m\lambda}\right)\right] \quad (3)$$

In this case, an output $f7b[\theta]$ of the sub detector 107b and an output $f7c[\theta]$ of the sub detector 107c can respectively be expressed by:

[Formula 4]

$$\begin{aligned}
f_{7b}[\theta] &= \frac{1}{2}\left\{1 + \alpha \sin\left[2\pi \frac{\theta + \lambda/2}{\lambda} + \delta(\theta + \lambda/2)\right]\right\} \\
&= \frac{1}{2}\left\{1 + \sin\left[2\pi \frac{\theta}{\lambda} + \delta(\theta + \lambda/2) + \pi\right]\right\} \\
&= \frac{1}{2}\left\{1 - \sin\left[2\pi \frac{\theta}{\lambda} + \beta \sin\left(2\pi \frac{\theta}{m\lambda} + \frac{\pi}{m}\right)\right]\right\}
\end{aligned} \quad (4)$$

[Formula 5]

$$\begin{aligned}
f_{7c}[\theta] &= \frac{1}{2}\left\{1 + \alpha \sin\left[2\pi \frac{\theta - \lambda/2}{\lambda} + \delta(\theta - \lambda/2)\right]\right\} \\
&= \frac{1}{2}\left\{1 + \alpha \sin\left[2\pi \frac{\theta}{\lambda} + \delta(\theta - \lambda/2) - \pi\right]\right\} \\
&= \frac{1}{2}\left\{1 - \alpha \sin\left[2\pi \frac{\theta}{\lambda} + \beta \sin\left(2\pi \frac{\theta}{m\lambda} - \frac{\pi}{m}\right)\right]\right\}
\end{aligned} \quad (5)$$

Here, in a case where $\beta$ is small and m is large, $f7a[\theta]-(f7b[\theta]+f7c[\theta])$ may approximate as in a formula below:

[Formula 6]

$$f_{7a}[\theta] - (f_{7b}[\theta] + f_{7c}[\theta]) \approx 2\alpha \sin\left[2\pi \frac{\theta}{\lambda} + \beta \sin\left(2\pi \frac{\theta}{\Lambda}\right)\right] \quad (6)$$

Note that $\beta$ represents a phase amplitude of the phase-modulated wave, which can voluntarily be set within $0<\beta<\pi$, and m is a natural number.

Furthermore, an output $f8a[\theta]$ of the sub detector 108a and an output $f8b[\theta]$ of the sub detector 108b can respectively be expressed by:

[Formula 7]

$$\begin{aligned}
f_{8a}[\theta] &= 1 + \alpha \sin\left[2\pi \frac{\theta + \lambda/4}{\lambda} + \delta(\theta + \lambda/4)\right] \\
&= 1 + \alpha \sin\left[2\pi \frac{\theta}{\lambda} + \beta \sin\left(2\pi \frac{\theta}{m\lambda} + \frac{\pi}{2m}\right) + \frac{\pi}{4}\right] \\
&= 1 + \alpha \cos\left[2\pi \frac{\theta}{\lambda} + \beta \sin\left(2\pi \frac{\theta}{m\lambda} + \frac{\pi}{2m}\right)\right]
\end{aligned} \quad (7)$$

[Formula 8]

$$f_{8b}[\theta] = 1 + \alpha\sin\left[2\pi\frac{\theta - \lambda/4}{\lambda} + \delta(\theta - \lambda/4)\right] \quad (8)$$
$$= 1 + \alpha\sin\left[2\pi\frac{\theta}{\lambda} + \beta\sin\left(2\pi\frac{\theta}{m\lambda} - \frac{\pi}{2m}\right) - \frac{\pi}{4}\right]$$
$$= 1 - \alpha\cos\left[2\pi\frac{\theta}{\lambda} + \beta\sin\left(2\pi\frac{\theta}{m\lambda} - \frac{\pi}{2m}\right)\right]$$

Here, in a case where β is small and m is large, f8a[θ]−f8b[θ] may approximate as in a formula below:

[Formula 9]

$$f_{8b}[\theta] - f_{8b}[\theta] \approx 2\alpha\cos\left[2\pi\frac{\theta}{\lambda} + \beta\sin\left(2\pi\frac{\theta}{\Lambda}\right)\right] \quad (9)$$

Hence, at an identical position θ, the optical detector 107 outputs a sine signal, and the optical detector 108 outputs a cosine signal.

A division is performed of the sine signal of the optical detector 107 and the cosine signal of the optical detector 108 in the electric angle operating part 106a of the operating unit 106; that is, the electric angle expressed by a formula (10) below is obtained by an arctangent operation.

[Formula 10]

$$\arctan\left\{\frac{2\alpha\sin\left[2\pi\frac{\theta}{\lambda} + \beta\sin\left(2\pi\frac{\theta}{\Lambda}\right)\right]}{2\alpha\cos\left[2\pi\frac{\theta}{\lambda} + \beta\sin\left(2\pi\frac{\theta}{\Lambda}\right)\right]}\right\} = 2\pi\frac{\theta}{\lambda} + \beta\sin\left(2\pi\frac{\theta}{\Lambda}\right) \quad (10)$$

Moreover, the optical detector 109 and the optical detector 110 configuring the second optical detector pair are arranged at positions that are displaced by half a period of the phase-modulated period, i.e., Λ/2, with respect to the optical detector 107 and the optical detector 108 configuring the first optical detector pair. Hence, in the output of the arctangent operation which is obtained from the optical detector 109 and the optical detector 110, as shown in a formula (II) below, sign of the phase-modulated term is inverted in comparison with that of in the formula (10).

[Formula 11]

$$2\pi\frac{\theta}{\lambda} + \beta\sin\left(2\pi\frac{\theta - \Lambda/2}{\Lambda}\right) = 2\pi\frac{\theta}{\lambda} + \beta\sin\left(2\pi\frac{\theta}{\Lambda} - \pi\right) \quad (11)$$
$$= 2\pi\frac{\theta}{\lambda} - \beta\sin\left(2\pi\frac{\theta}{\Lambda}\right)$$

Further, in the summing part 106b of the operating unit 106, an operated result of the electric angle indicated in the formula (10) by the optical detector 107 and the optical detector 108 configuring the first optical detector pair and an operated result of the electric angle indicated in the formula (II) by the optical detector 109 and the optical detector 110 configuring the second optical detector pair are summed. From this summing operation, an electric angle of the fundamental period as shown in below formula (12) is acquired.

[Formula 12]

$$\left\{2\pi\frac{\theta}{\lambda} + \beta\sin\left(2\pi\frac{\theta}{\Lambda}\right)\right\} + \left\{2\pi\frac{\theta}{\lambda} - \beta\sin\left(2\pi\frac{\theta}{\Lambda}\right)\right\} = 4\pi\frac{\theta}{\lambda} \quad (12)$$

Further, in the subtracting part 106c of the operating unit 106, by operating a subtraction of the operated result of the electric angle indicated in the formula (10) and the operated result of the electric angle indicated in the formula (II), a phase modulated component as indicated in a formula (13) below is extracted.

[Formula 13]

$$\left\{2\pi\frac{\theta}{\lambda} + \beta\sin\left(2\pi\frac{\theta}{\Lambda}\right)\right\} - \left\{2\pi\frac{\theta}{\lambda} - \beta\sin\left(2\pi\frac{\theta}{\Lambda}\right)\right\} = 2\beta\sin\left(2\pi\frac{\theta}{\Lambda}\right) \quad (13)$$

From a signal of a phase-modulated period Λ acquired by the formula (13), an interpolation angle can be detected. However, in order to improve precision of the interpolation angle, preferably, below techniques are utilized.

That is, the signal of the phase-modulated period Λ is a sine signal as indicated in the formula (13), and a positional dependency exists in an electric angle resolution.

On the other hand, the optical detectors 111, 112 configuring the third optical detector pair and the optical detectors 113, 114 configuring the fourth optical detector pair are arranged at respective positions that are displaced by one-fourth of the period of the phase-modulated period (Λ/4) from each other with respect to the optical detectors 107, 108 configuring the first optical detector pair and the optical detectors 109, 110 configuring the second optical detector pair. Hence, regarding the optical detectors 111, 112 of the third optical detector pair and the optical detectors 113, 114 of the fourth optical detector pair, similar to the case of the aforementioned first optical detector pair and the second optical detector pair, a difference of the operated results of the electric angles is operated in the operating unit 106. Thereby, as shown in a formula (14) below, a phase-modulated signal with cosine waveform that is shifted by 90° phase of the electric angle relative to the formula (13) can be acquired.

[Formula 14]

$$2\beta\sin\left(2\pi\frac{\theta + \Lambda/4}{\Lambda}\right) = 2\beta\sin\left(2\pi\frac{\theta}{\Lambda} + \pi/2\right) = 2\beta\cos\left(2\pi\frac{\theta}{\Lambda}\right) \quad (14)$$

Moreover, in the electric angle operating part 106a of the operating unit 106, an arctangent operation of the phase-modulated signal indicated in the formula (13) that is acquired from the first optical detector pair and the second optical detector pair and the phase-modulated signal indicated in the formula (14) that is acquired from the third optical detector pair and the fourth optical detector pair is carried out. From the result of this operation, an electric angle of 2πθ/Λ of the period Λ having no positional dependency in the electric angle resolution can be obtained.

As mentioned above, according to the optical encoder of the present first embodiment, the electric angle of the phase-modulated signal can be determined with higher precision. Due to this, compared to the conventional ones, the optical encoder having higher resolution can be provided.

Second Embodiment

In the optical encoder of the first embodiment, as stated above, the first optical detector pair is formed by the optical detector 107 and the optical detector 108, the second optical detector pair is formed by the optical detector 109 and the optical detector 110, the third optical detector pair is formed by the optical detector 111 and the optical detector 112, and the fourth optical detector pair is formed by the optical detector 113 and the optical detector 114, respectively.

Compared to the first embodiment, in the present embodiment, a first optical detector pair is formed by the optical detector 107 and the optical detector 111 as well as the optical detector 108 and the optical detector 112, a second optical detector pair is formed by the optical detector 109 and the optical detector 113 as well as the optical detector 110 and the optical detector 114, a third optical detector pair is formed by the optical detector 111 and the optical detector 109 as well as the optical detector 112 and the optical detector 110, and a fourth optical detector pair is formed by the optical detector 113 and the optical detector 107 as well as the optical detector 114 and the optical detector 108, respectively. Other configurations are identical to that of the optical encoder of the first embodiment.

Further detailed explanation will be given with the first optical detector pair as an example. Note that the same explanation as below applies similarly to the other optical detector pairs.

As explained in the first embodiment, a sine wave output is acquired from the optical detector 107 and the optical detector 111 that are arranged on the same circumference on the outer circumference side, and a cosine wave output is acquired from the optical detector 108 and the optical detector 112 that are arranged on the inner circumference side. In the electric angle operating part 106a of the operating unit 106, a division of the sine wave output and the cosine wave output is performed, i.e., an arctangent operation is performed, and thereby an electric angle similar to that indicated in the formula (10) can be acquired.

The first optical detector pair and the second optical detector pair as well as the third optical detector pair and the fourth optical detector pair of the second embodiment have, similar to the case of the first embodiment, a phase relationship that is displaced by half the period of the phase-modulated period, i.e., by $\Lambda/2$. Moreover, the first optical detector pair and the third optical detector pair as well as the second optical detector pair and the fourth optical detector pair of the present second embodiment have a phase relationship that is displaced by one-fourth of the period of the phase-modulated period, i.e., by $\Lambda/4$. Therefore, as explained in the first embodiment, an electric angle of the fundamental period is determined by the operation of the above formula (12), and a phase-modulated component is extracted by the operation of the above formula (13).

As in the optical encoder of the second embodiment, e.g. by sharing the output from the optical detector 107 and the optical detector 108 between two optical detectors, i.e., the first optical detector pair and the fourth optical detector pair, the output of the signal inputted to the operating unit 106 can be doubled compared to the case of the first embodiment. Hence, according to the optical encoder of the second embodiment, in addition to achieving the effect as in the first embodiment above, the optical encoder has an advantage that the electric angle of the phase-modulated signal can be determined with a higher precision even in a case where only a faint signal can be detected.

Third Embodiment

Figure 6:
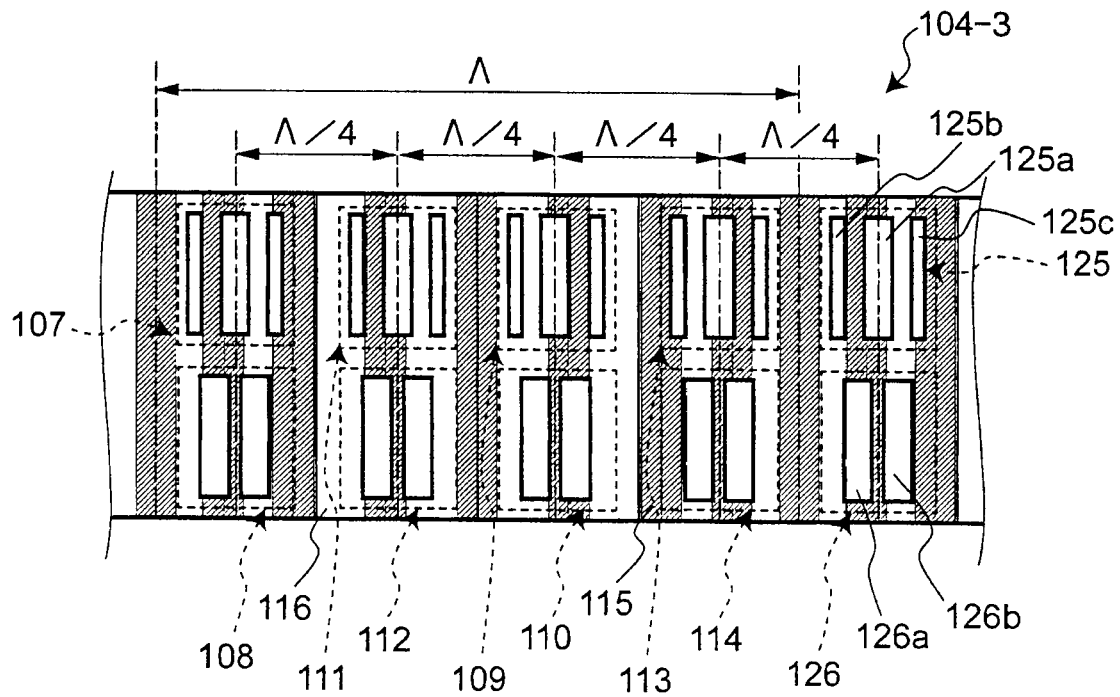
FIG. 6 is a view for explaining a configuration of an optical detector included in an optical encoder of a second embodiment of the present invention, and is a linearly exploded view of the optical detector.

FIG. 6 shows a schematic diagram of an arrangement of respective optical detectors configuring an optical detecting part 104-3 provided in an optical encoder of the third embodiment of the present invention. Note that, in FIG. 6, the respective optical detectors are shown in a linearly exploded manner similar to the case in FIG. 5.

The basic configuration of the optical encoder of the present third embodiment is similar to those of the first and second embodiments, however, the configuration of the optical detecting part differs therefrom. That is, the optical detecting part 104-3 provided in the optical encoder of the present third embodiment further includes an optical detector 125 and an optical detector 126 at positions that are $\Lambda/4$ toward the right side of the aforementioned optical detector 113 and the optical detector 114. The optical detector 125 includes sub detectors 125a, 125b, 125c, and the optical detector 126 includes sub detectors 126a, 126b. The sub detectors 125a, 125b, 125c have identical configurations as the aforementioned sub detectors 107a, 107b, 107c. Further, the sub detectors 126a, 126b have identical configurations as the aforementioned sub detectors 108a, 108b.

Here, because the pattern of the signal track 103 is modulated by the period $\Lambda$, signals with identical phase can be acquired from the optical detector 125 and the optical detector 107 and from the optical detector 126 and the optical detector 108.

Furthermore, in the optical encoder of the present third embodiment, a first optical detector pair is formed by the optical detector 107 and the optical detector 111 as well as the optical detector 108 and the optical detector 112, a second optical detector pair is formed by the optical detector 109 and the optical detector 113 as well as the optical detector 110 and the optical detector 114, a third optical detector pair is formed by the optical detector 111 and the optical detector 109 as well as the optical detector 112 and the optical detector 110, and a fourth optical detector pair is formed by the optical detector 113 and the optical detector 125 as well as the optical detector 114 and the optical detector 126, respectively.

In the optical encoder of the present third embodiment configured as above, the first optical detector pair and the second optical detector pair as well as the third optical detector pair and the fourth optical detector pair have, similar to the case of the second embodiment, the phase relationship that is displaced by half the period of the phase-modulated period, i.e., by $\Lambda/2$. Further the first optical detector pair and the third optical detector pair as well as the second optical detector pair and the fourth optical detector pair have the phase relationship that is displaced by one-fourth of the period of the phase-modulated period, i.e., by $\Lambda/4$. Therefore, in the operating unit 106 provided in the optical encoder of the present third embodiment, as explained in the first embodiment, an electric angle of the fundamental period is determined by the operation of the above formula (12), and the phase-modulated component is extracted by the operation of the above formula (13).

In the second embodiment, each of the first optical detector pair, the second optical detector pair, and the third optical detector pair acquires the outputs from the optical detectors that are arranged at the interval of $\Lambda/4$; whereas the fourth optical detector pair acquires the outputs from the optical detectors that are arranged at an interval of $3\Lambda/4$. Because the pattern of the signal track 103 is modulated by the period of $\Lambda$, the optical detector 113 and the optical detector 107 as well as the optical detector 114 and the optical detector 108 of the fourth optical detector pair in regards to their output phase are, similar to the other optical detectors, in the positional relationship having the phase of Λ/4. However, the optical detectors 113, 107, 114, 108 in the fourth optical detector pair differ from the other optical detectors in their mechanical angular positions within actual one rotation of the scale 102. Hence, in a case where e.g. the scale 102 is assembled to the rotating shaft 105 with some degree of displacement, in the configuration of the second embodiment, there is a concern that only the fourth optical detector pair exhibits a signal behavior that is different from those of the other optical detectors.

Contrary thereto, in the configuration in the present third embodiment, all of the first to fourth optical detector pairs have identical phase as well as identical mechanical angular position within one rotation of the scale 102. Therefore, even in a case where e.g. the scale 102 is assembled to the rotating shaft 105 with some degree of displacement, according to the optical encoder of the third embodiment, an effect that a stable signal can be obtained can be achieved. Needless to say, the optical encoder of the present third embodiment can also achieve the effect that is achieved by the optical encoder of the first embodiment above.

Fourth Embodiment

Figure 7:
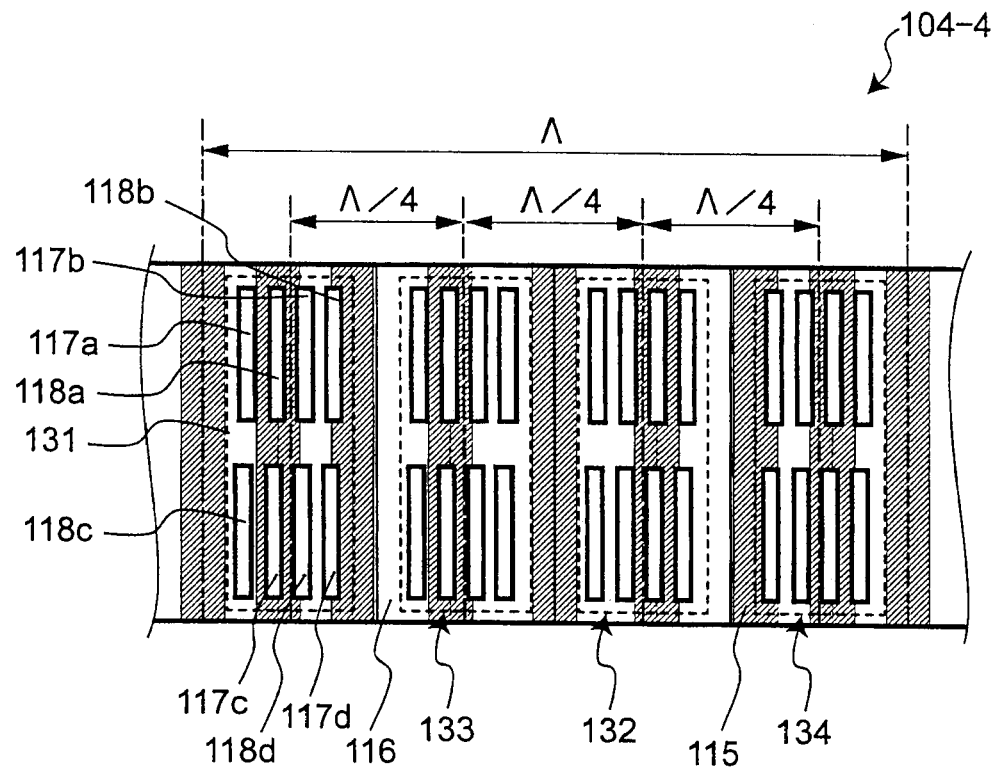
FIG. 7 is an enlarged view of a signal track of an optical encoder of a fourth embodiment of the present invention.

FIG. 7 shows a schematic diagram of an arrangement of an optical detecting part 104-4 provided in an optical encoder of the fourth embodiment of the present invention. Note that, in FIG. 7, respective optical detectors are shown in a linearly exploded manner similar to the cases in FIG. 5 and FIG. 6.

The basic configuration of the optical encoder of the present fourth embodiment is similar to those of the first and second embodiments, however, the configuration of the optical detecting part differs therefrom.

That is, the optical detecting part 104-4 shown in FIG. 7 provided in the optical encoder of the present fourth embodiment includes optical detectors 131 to 134. The optical detectors 131 to 134 have identical configurations. With the optical detector 131 taken as an example, the optical detector 131 includes sub detectors 117a, 117b, 117c, 117d, 118a, 118b, 118c, and 118d. Although numbers thereof differ, the sub detectors 117a, 117b, 117c, and 117d correspond to the sub detectors 107a to 107c of the optical detector 107 of the first embodiment, and the sub detectors 118a, 118b, 118c, and 118d correspond to the sub detectors 108a, 108b of the optical detector 108 of the first embodiment.

The sub detectors 117a to 117d and the sub detectors 118a to 118d are all configured with identical amount of areas. The sub detector 118a is arranged at a position that is displaced by one-fourth of the fundamental period λ from the sub detector 117a. In regards to the sub detector 117b and sub detector 118b, the sub detector 117c and sub detector 118c, and the sub detector 117d and sub detector 118d, they are arranged at respective positions that are displaced by one-fourth of the fundamental period λ. The sub detector 117a and the sub detector 117c as well as the sub detector 117b and sub detector 117d are arranged at positions that are displaced from each other by half the fundamental period λ respectively. Similarly, the sub detector 118a and the sub detector 118c as well as the sub detector 118b and sub detector 118d are arranged at positions that are displaced from each other by half of the fundamental period λ respectively.

Further, the sub detectors 117a, 117b and the sub detectors 118a, 118b are arranged along an identical diameter of the scale 102, the sub detectors 117c, 117d and the sub detectors 118c, 118d are arranged along an identical diameter of the scale 102, and the sub detectors 117a, 117b, 118a, 118b and the sub detectors 117c, 117d, 118c, 118d are arranged along the respective diameters of the scale 102 that are different from each other.

Further, the optical detector 131 and the optical detector 132 that correspond to the first optical detector pair and the second optical detector pair as explained in the first embodiment are, similar to the first embodiment, arranged at positions that are apart by the period of Λ/2 (which in general is the period of $\{(2n+1)\ \Lambda/2\}$). Similarly, the optical detector 133 and the optical detector 134 that correspond to the third optical detector pair and the fourth optical detector pair are arranged at positions that are apart by the period of Λ/2 (which in general is the period of $\{(2n+1)\ \Lambda/2\}$). Moreover, the optical detector 131 and the optical detector 133, the optical detector 133 and the optical detector 132, and the optical detector 132 and the optical detector 134 are arranged at positions that are apart by the period of Λ/4 (which in general is the period of $\{(2n+1)\ \Lambda/4\}$).

The optical encoder of the present fourth embodiment including the optical detecting part 104-4 configured as above operates as described below.

In regards to the operation, the present embodiment is almost the same as that of the first embodiment. That is, assuming an output of the sub detector 117a as f7a[θ], an output of the sub detector 117b as f7b[θ], an output of the sub detector 107c as f7c[θ], and an output of the sub detector 117d as f7d[θ], then (f7a[θ]+f7c[θ])−(f7b[θ]+f7d[θ]) comes to be an output that is similar to the sine output f7a[θ]−(f7b[θ]+f7c[θ]) of the formula (6) as explained in the first embodiment. Similarly, in regards to the optical detectors 118a to 118d also, assuming outputs thereof as f8a[θ], f8b[θ], f8c[θ], f8d[θ] respectively, then (f8a[θ]+f8c[θ])−(f8b[θ]+f8d[θ]) comes to be an output that is similar to the cosine output f8a[θ]−f8b[θ] of the formula (9) as explained in the first embodiment. Similarly hereinbelow, by performing operation in the electric angle operating part 106a of the operating unit 106, the optical encoder of the present fourth embodiment can achieve the same effect as described in the first embodiment.

In the first embodiment, by arranging the sub detectors 107b and 107c so as to interpose the sub detector 107a therebetween, an effect of substantially matching the respective phases of the sine output f7a[θ]−(f7b[θ]+f7c[θ]) of the formula (6) and the cosine output f8a[θ]−f8b[θ] of the formula (9) with respect to the rotation angle of the scale 102 can be achieved. However, in the first embodiment, the sub detector 107 results in outputting signals from wider angular range than the sub detector 108. Hence, in a case where the scale 102 is assembled with displacement with respect to a rotation center, there may be cases where a phase displacement occurs between the outputs that are operated by using the formula (6) and the formula (9), and an error in the angle detection occurs in the electric angle that is operated by using the formula (10).

With respect to the above, in the optical encoder of the present fourth embodiment, e.g. in the optical detector 131, the sub detectors 117a to 117d and the sub detectors 118a to 118d are evenly arranged along the outer circumference side and the inner circumference side of the scale 102. Therefore, the phases of the sine output and the cosine output with respect to the rotation angle of the scale 102 can be made to match substantially, and the angular range of the signal detection for the sine output and the cosine output can also be made to match substantially. Hence, including the case where the scale 102 is assembled with displacement with respect to the rotation center, the optical encoder of the fourth embodiment is capable of acquiring an even more stable angle detection value than the optical encoder of the first embodiment. Needless to say, in the optical encoder of the fourth embodiment also, because of including the single signal track 103, size reduction of the scale 102 can be achieved similar to the optical encoder of the first embodiment.

Fifth Embodiment

An optical encoder of the present fifth embodiment employs a similar signal processing method as in the second embodiment above for the optical detecting part 104-4 of the optical encoder of the fourth embodiment above. Thus, the present optical encoder is configured so as to detect the signal intensity in the optical detecting part 104-4 with larger magnitude.

Specific explanation will be given below. In the fourth embodiment, the optical detectors 131 to 134 each configures an independent detector. In contrast, in the optical encoder of the fifth embodiment, a first optical detector pair is formed by the optical detector 131 and the optical detector 133, a second optical detector pair is formed by the optical detector 132 and the optical detector 134, a third optical detector pair is formed by the optical detector 133 and the optical detector 132, and a fourth optical detector pair is formed by the optical detector 134 and the optical detector 131, respectively.

Due to the above configuration, in the present fifth embodiment also, e.g. the output from the optical detector 131 can be shared by the first optical detector pair and the fourth optical detector pair, similar to the second embodiment. Consequently, the output of the signals inputted to the operating unit 106 in the case of the present fifth embodiment is capable of being a doubled output compared to the case of the fourth embodiment. Hence, similar to the case of the second embodiment, the optical encoder of the present fifth embodiment has an advantage that the electric angle of the phase-modulated signal can be determined with even higher precision even in the case where only a faint signal can be detected. Further, the optical encoder of the present fifth embodiment can surely achieve the effect that can be achieved by the optical encoder of the first embodiment.

Sixth Embodiment

Figure 8:
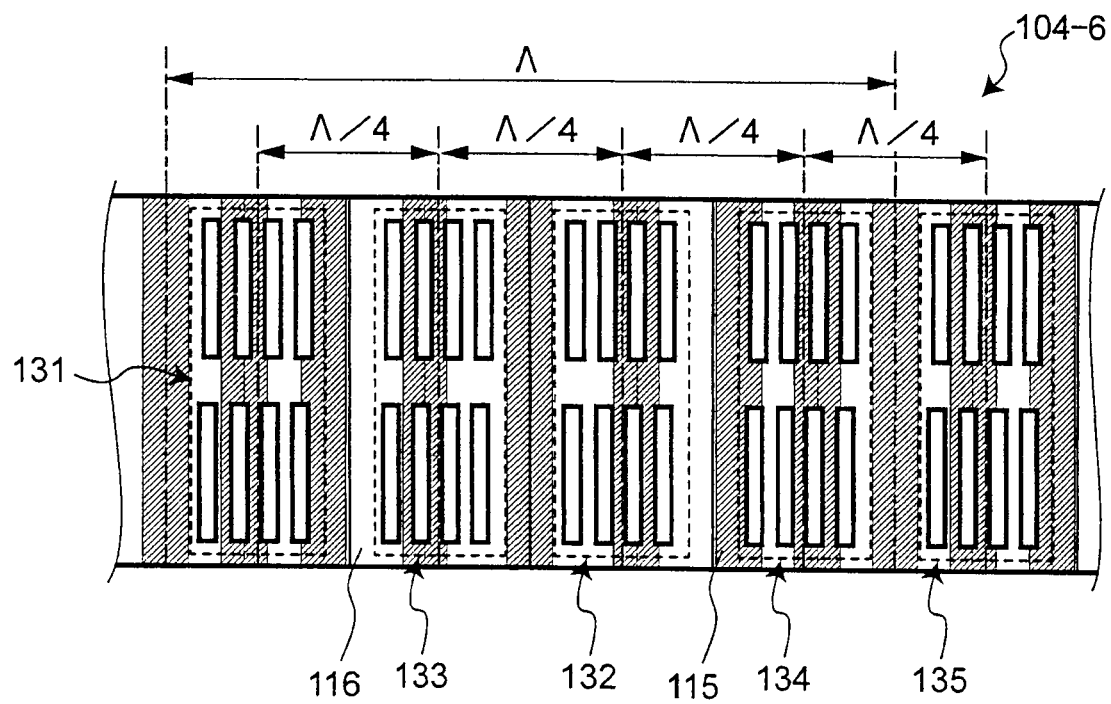
FIG. 8 is an enlarged view of a signal track of an optical encoder of a sixth embodiment of the present invention.

FIG. 8 shows a schematic diagram of an arrangement of optical detectors configuring an optical detecting part 104-6 provided in an optical encoder of the sixth embodiment of the present invention. Note that, in FIG. 8 also, the respective optical detectors are shown in a linearly exploded manner similar to the cases in FIG. 5, etc.

The basic configuration of the optical encoder of the present sixth embodiment is similar to those of the first and second embodiments, however, the configuration of the optical detecting part differs therefrom. As shown in FIG. 8, the optical detecting part 104-6 provided in the optical encoder of the present sixth embodiment includes the optical detectors 131 to 134 that are similar to the cases in the fourth embodiment and fifth embodiment as mentioned above, and further includes an optical detector 135 at a position that is $\Lambda/4$ toward the right side of the aforementioned optical detector 134. In each of the optical detectors 131 to 135, configuration of sub detectors that are provided in the optical detectors is identical to the configuration described in the fourth embodiment.

Further, in the present sixth embodiment, a first optical detector pair is formed by the optical detector 131 and the optical detector 133, a second optical detector pair is formed by the optical detector 132 and the optical detector 134, a third optical detector pair is formed by the optical detector 133 and the optical detector 132, and a fourth optical detector pair is formed by the optical detector 134 and the optical detector 135.

In the optical encoder of the present sixth embodiment configured as above, the effect that can be achieved by the optical encoder of the first embodiment can be surely achieved; and an effect which collectively enjoys the effect of the optical encoder of the third embodiment as well as the effects of the optical encoders of the fourth and fifth embodiments can further be achieved.

Seventh Embodiment

In the optical encoders of the first to sixth embodiments, the scale 102 has the configuration of including the single signal track 103. By having the single signal track 103, the optical encoders of the first to sixth embodiments achieve the effect of reducing the size of the scale 102.

Figure 9:
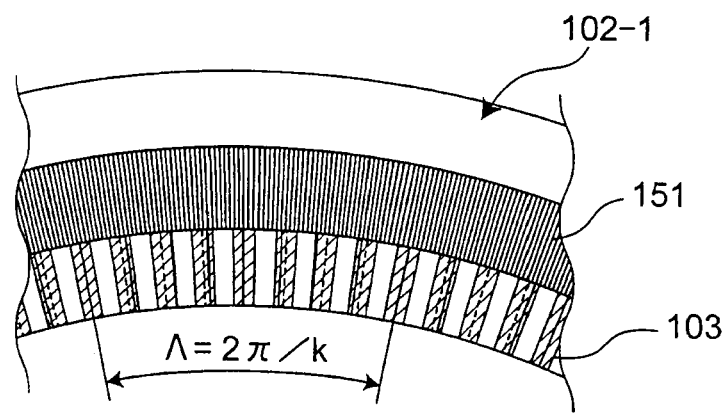
FIG. 9 is an enlarged view of a signal track of an optical encoder of a seventh embodiment of the present invention.

On the other hand, in a scale 102-1 as shown in FIG. 9, a plurality of signal tracks 103, 151 may be arranged. An optical encoder of the present seventh embodiment has a configuration of having the aforementioned scale 102-1 in substitute for the scale 102 that is provided in the optical encoder of the first embodiment. The second signal track 151 in the scale 102-1 is configured by a signal track with uniform pitch, which is a pitch that is finer than the fundamental period of the first signal track 103.

Further, in the optical encoder of the present seventh embodiment, two optical detecting parts 104, 104 as described in the first embodiment are arranged to face the signal tracks 103, 151 respectively. Note that, the light source 101 and the operating unit 106 may be arranged to correspond to each of the signal tracks 103, 151; or alternately, they may be configured to be shared by the signal tracks 103, 151.

Moreover, in the optical encoder of the present seventh embodiment, the pitch of the second signal track 151 is set, so as to make further improvement from the precision of the interpolation of the electric angle of the fundamental period, which is determined by the operating unit 106 according to the pattern of the first signal track 103. Due to this, a wavenumber position of the second signal track 151 can be specified based on the first signal track 103.

Yet further, in the optical encoder of the present seventh embodiment, the second signal track 151 may include a signal pattern having one period that corresponds to one rotation of the scale 102-1, and the detection precision thereof may be set to be more severe than the phase-modulated period that can be acquired by the first signal track 103. Due to this, a wavenumber position of the phase-modulated period can be specified in the second signal track 151, and moreover, a wavenumber position of the fundamental period of the first signal track 103 can be specified by the electric angle of the phase-modulated signal acquired from the first signal track 103. An absolute angular position of one rotation can be specified.

Further, a third signal track having a finer pitch than the fundamental period of the first signal track 103 may further be added. In this case, detection of an absolute value of the one rotation defining the resolution by the third signal track becomes possible.

As described above, according to the optical encoder of the present seventh embodiment, although the optical encoder of the seventh embodiment is slightly inferior to the configurations in the first to sixth embodiments regarding the size reduction due to the arrangement of two signal tracks, it is capable of achieving higher resolution than the optical encoders of the first to sixth embodiment.

Eighth Embodiment

An optical encoder of the eighth embodiment will be described next.

As one problem in the conventional optical encoder, the gaps in the optical system, i.e., respective spaces between the light source and the optical detectors with respect to the signal track of the scale should be improved. As one effective way to solve this problem, an optical system that uses three gratings may be applied. In this three gratings system, the aforementioned gaps are determined by a pitch of slits that configure a signal track on a scale. Hence, in a case where slits with long period and slits with short period are to be arranged on the scale so as to perform an absolute value detection of a rotation angle of the scale, a difference in the required gaps of the optical system becomes too large; and there lies a problem that configuring the optical encoder thereby becomes difficult.

Explanation will be given specifically. As described in the seventh embodiment, in order to detect the absolute rotation angle of one rotation of the scale, a second signal track having slits that are arranged with a single pitch which is finer than a pitch forming a fundamental period of the second signal track is used. An optical system with three gratings using the second signal track will be taken as an example. In this configuration, the signal pitch of the slits configuring the track differs between the first signal track and the second signal track. Hence, the position with respect to the scale of the respective optical detecting parts at which an image of the slits with respect to each of the signal tracks can best be generated differs. In other words, an optimal gap between each of the optical detecting parts and the scale differs between the first signal track and the second signal track. Therefore, there lies a problem that configuring the optical system having such respective optical detecting parts becomes difficult.

Therefore, in the optical encoder of the present eighth embodiment, the scale includes a main slit signal track configuring a vernier and a sub slit signal track that has a different wavenumber from the main slit signal track by a predetermined wavenumber. Further, the optical encoder of the eighth embodiment is configured such that a waveform obtained from the sub slit comes to be a waveform in which the phase-modulated wave is superimposed in a predetermined period over the sine wave of the fundamental period.

Figure 10:
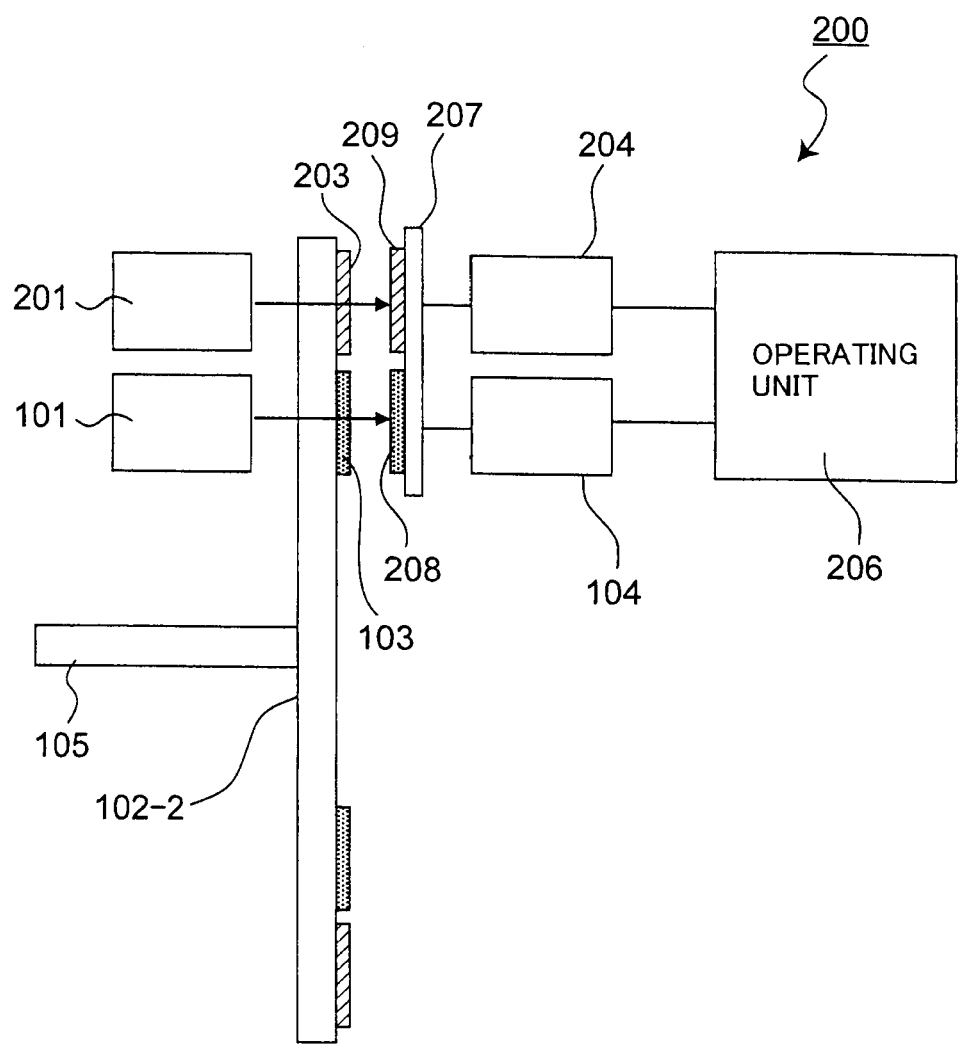
FIG. 10 is a configuration diagram of an optical encoder of an eighth embodiment of the present invention.

By configuring as above, the signal pitches of the respective slits configuring the two signal tracks can be made to be similar to each other. Hence, the aforementioned gaps in the optical system of the optical encoder do not become too large and different from each other. Thereby, the application of the optical system using three gratings becomes possible. With reference to FIG. 10, further details will be explained hereinbelow.

FIG. 10 is a configuration diagram of an optical encoder 200 of the present eighth embodiment. The optical encoder 200 includes light sources 101, 201, a scale 102-2, optical detecting parts 104, 204, and an operating unit 206 to be connected to the optical detecting part 104.

The light source 101, the first signal track 103, and the optical detecting part 104 are similar to the configuration described in the first embodiment.

The scale 102-2 that rotates with the rotating shaft 105 as its center and includes the first signal track 103 further includes a second signal track 203 adjacent to the first signal track 103 at an outer circumference side than the first signal track 103. The light source 201 and the optical detecting part 204 are arranged to face the second signal track 203. The operating unit 206 is an operating means that operates signals acquired from the optical detecting parts 104, 204 so as to output a rotation angular position of the scale 102-2. Note that the operating unit 206 is a unit that performs similar operation as the operating unit 106 described in the first embodiment, and functionally includes the aforementioned electric angle operating part 106a, the summing part 106b and the subtracting part 106c.

In the present embodiment, the light sources 101, 201 are arranged as one for each of the tracks 103, 203, however, a configuration in which a single light source is emitted to the two signal tracks 103, 203, and the penetrating lights therefrom are detected by the optical detecting parts 104, 204 may be employed. Further, in the present embodiment, as shown in the drawing, a fixed scale 207 is arranged between the optical detecting parts 104, 204 and the scale 102-2. The fixed scale 207 includes detection slits 208 arranged facing to the first signal track 103, and detection slits 209 arranged facing to the second signal track 203. However, configuration thereof is not limited to the above, and may alternately be configured to detect the penetrating lights from the signal tracks 103, 203 directly by the optical detecting parts 104, 204, as is the case with the first embodiment.

Figure 11:
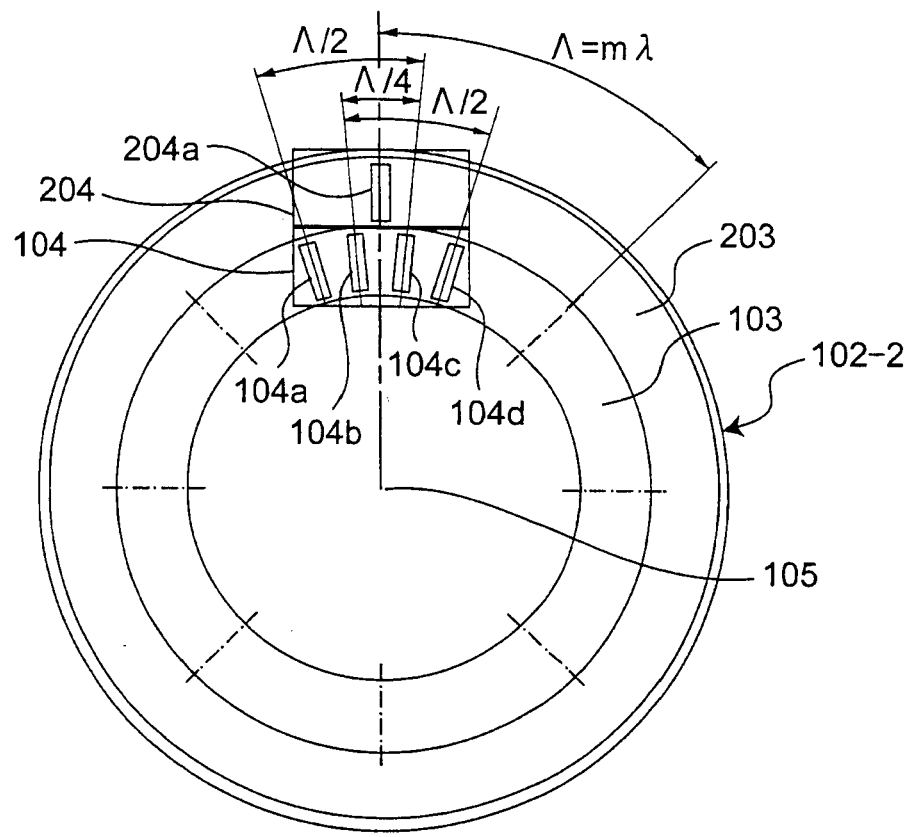
FIG. 11 is a plan view of a signal track of the optical encoder of the eighth embodiment of the present invention.

FIG. 11 shows an arrangement of the first signal track 103 and the second signal track 203 of the scale 102-2 and the optical detecting parts 104, 204. The second signal track 203 is provided with slits at a period $\xi$ which divides the whole circumference of the first signal track 103 into "n" equal segments. Although not shown in detail in the figure, an optical detecting part is configured by the optical detecting part 204, which outputs a sine wave and a cosine wave corresponding to the period $\xi$, or by a combination of the optical detecting part 204 with the detection slits 209.

Note that, configuration similar to that in the first to sixth embodiments can be employed for the optical detecting part 104 with respect to the first signal track 103. Although the optical detecting part 104 in FIG. 11 is identical to the configuration shown in FIG. 3, for the sake of simplicity of the drawings, the optical detector 107 and the optical detector 108 shown in FIG. 3 are depicted by one block as an optical detector pair 104a; the optical detector 111 and the optical detector 112 are depicted by one block as an optical detector pair 104b; the optical detector 109 and the optical detector 110 are depicted by one block as an optical detector pair 104c; and the optical detector 113 and the optical detector 114 are depicted by one block as an optical detector pair 104d.

Moreover, the optical detecting part 204 depicts two optical detectors by one block as an optical detector pair 204a.

The second signal track 203 includes the slits arranged at the period $\xi$ which divides the one circumference of the first signal track 103 into n equal segments, and the first signal track 103 is given the phase modulation that is repeated every period of $\Lambda=m\lambda$ (m being a natural number) of the fundamental period $\lambda$. Further, the period $\Lambda$ of the phase modulation is an angle that divides the one circumference of the first signal track 103 into "k" equal segments. In the present eighth embodiment, it is assumed n=2048, k=16, and m=112. That is, assuming that the period of the second signal track 203 as $\xi=360/n$, and the fundamental period $\lambda$ of the first signal track 103 as $\lambda=360/L$, then a difference in the frequency "j" is j=n−L=256. The vernier is formed by the difference in the frequency j=n−L of the first signal track 103 and the second signal track 203. That is, in the present eighth embodiment, three frequency signals, namely 2048 waves, 256 waves, and 16 waves, can be acquired from the two signal tracks 103 and 203.

Further, by assuming a radius position of the second signal track 203 (which is the main signal track) on the scale 102-2 as R, and arranging the first signal track 103 (which is the sub signal track) inner circumferential side than the second signal track 204, the signal pitches of the respective slits of the second signal track 203 and the first signal track 103 can be made identical. Specifically, if a radius position of the first signal track 103 is set at a position of R×(L/n), with respect to the pitch of the slits configuring the second signal track 203 being $2\pi R/n$, the pitch of the slits configuring the first signal track 103 becomes $2\pi(R\times L/n)/L=2\pi R/n$; the pitch of the slits configuring the first signal track 103 and the pitch of the slits configuring the second signal track 203 can be made to match.

By configuring as above, the pitch of the slits in the second signal track 203 and the pitch of the slits in the first signal track 103 can be made to coincide or substantially coincide. Hence, the aforementioned gaps in the optical system of the optical encoder do not become too large, and do not differ. Specifically, a space between the second signal track 203 and the optical detecting part 204 and a space between the first signal track 103 and the optical detecting part 104 can be made to coincide or substantially coincide. Hence, the employment of the optical system using three gratings becomes possible.

Further, as are the cases in the optical encoders of the first to seventh embodiments, it goes without saying that the optical encoder of the present eighth embodiment is capable of achieving the effect of high resolution.

In the present eighth embodiment, as shown in the drawings and as stated above, the optical encoder 200 is shown in the example of a rotary encoder, however, is not limited to this aspect. The present invention can alternately be applied to embodiments of linear encoders. Further, in the present eighth embodiment, the optical detecting parts 104, 204 detect the luminous fluxes from the light source 101, 201 which have penetrated the signal tracks 103, 203. However, the configuration is not limited to this embodiment. A reflecting light may alternately be detected.

Ninth Embodiment

In the eighth embodiment, the wavenumber L of the sub slits configuring the first signal track 103 is determined to be less than the wavenumber n of the main slits configuring the second signal track 203 such that the difference j in the frequencies of the first signal track 103 and the second signal track 203 becomes j=n−L. In contrast thereto, a wavenumber h of the sub slits may be larger than the wavenumber n of the main slits by the number j; that is, the wavenumber h may be set such that j=h−n. An optical encoder of the ninth embodiment has a configuration in which the wavenumber h of the sub slits is larger than the wavenumber n of the main slits by the number j. Note that, in the optical encoder of the ninth embodiment, other configurations are identical to those of the eighth embodiment.

Figure 12:
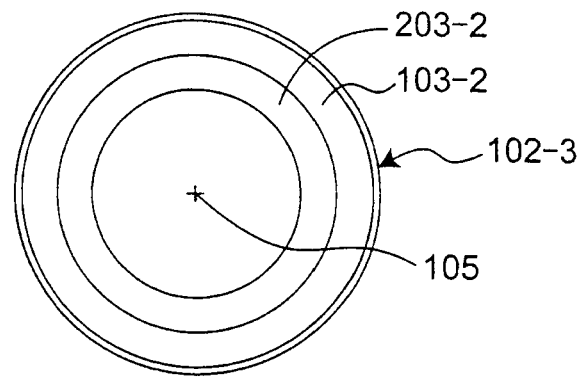
FIG. 12 is a plan view of a signal track of an optical encoder of a ninth embodiment of the present invention.

In the optical encoder of the ninth embodiment, as shown in FIG. 12, when assuming that a radius position of a second signal track 203-2 having the main slits on the scale as R, the first signal track 103-2 having the sub slits is arranged more toward the outer circumferential side than the second signal track 203-2. Due to this, the signal pitches of the respective slits of the second signal track 203-2 and the first signal track 103-2 can be made identical. Specifically, if the radius position of the first signal track 103-2 is set at a position of R×(h/n), with respect to the pitch of the second slits configuring the second signal track 203-2 being 2πR/n, the pitch of the first slits configuring the first signal track 103-2 becomes 2π(R×h/n)/h=2πR/n. As just described, the pitch of the first slits configuring the first signal track 103-2 and the second slits configuring the second signal track 203-2 can be made to coincide.

According to the optical encoder of the ninth embodiment, similar to the cases in the optical encoders of the first embodiment, etc., it goes without saying that the optical encoder of the present embodiment is capable of achieving the effect of high resolution; and in addition thereto, below effects can further be achieved. That is, in a case where an angular range occupied by the optical detecting part with respect to the scale is defined to be at a predetermined value, due to a curvature of the scale on the outer circumference side being smaller than that of the inner circumference side, larger area can be used as an actual area for the optical detecting part on the outer circumference side of the scale. Hence, it becomes physically easier to configure the optical detecting part by arranging the optical detecting part, in which a number of optical detectors becomes large so as to extract signals of the phase-modulated waves, to be on the outer circumference side of the scale. In the present embodiment, the first signal track 103-2 having the sub slits is arranged on the outer circumference side on the scale than the second signal track 203-2, and thereby the configuration of the optical detecting part can be made easier.

Tenth Embodiment

A configuration of an optical encoder of the tenth embodiment will be described. The basic, overall configuration of the optical encoder of the tenth embodiment is the same as the configurations shown in FIG. 10 and FIG. 11, however, it differs from the configurations in FIG. 10 and FIG. 11 in its arrangements of slits configuring the two signal tracks on the scale. Further, in regards to the detection slits 208, 209 shown in FIG. 10, configuration of the present tenth embodiment is different from the configuration in FIG. 10.

Firstly, a detailed configuration of the two signal tracks will be described with reference to FIGS. 13 to 16.

Figure 13:
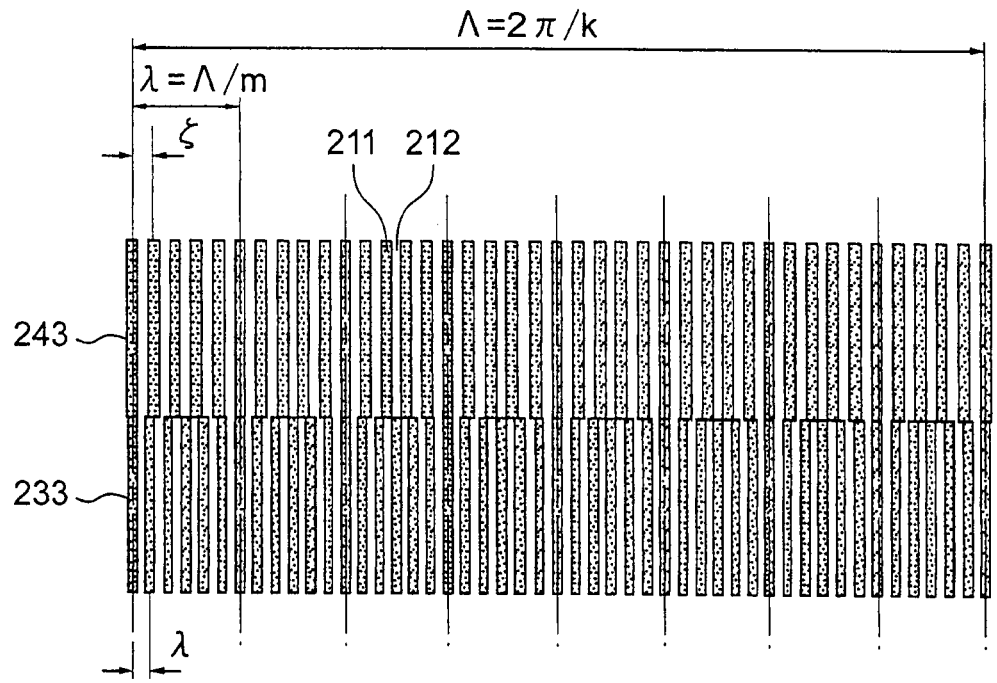
FIG. 13 is a linearly exploded view for explaining a Vernier type of a signal track of an optical encoder of a tenth embodiment of the present invention.

FIG. 13 is a linearly exploded view for explaining slit patterns patterned on signal tracks 233, 243 provided on a scale of the optical encoder of the tenth embodiment, in which angular positions within the circumference thereof are unfolded into linear positions. Note that the signal track 233 corresponds to the first signal track 103 shown in FIGS. 10, 11, and the signal track 243 corresponds to the second signal track 203.

Each of the slit patterns in the signal tracks 233, 243 gives a periodic sine wave modulation to light, and a dark section 211 and a bright section 212 for the modulation are arranged alternately. The slits configuring the signal track 243 are arranged at a regular period, and in the signal track 233, the slits are arranged at a modulated period λ. Each of the slit patterns of the signal tracks 233, 243 has the period Λ which is formed by dividing one circumference of the scale into k equal segments: Λ=2π/k. The slits of the period λ of the signal track 233 is given a periodically repeated phase modulation which forms m rows of slit rows within the period Λ.

On the other hand, the period ξ of the signal track 243 has a fundamental period with a wavenumber that is less than a wavenumber L in the period Λ of the period λ of the signal track 233 by a number j, and a phase modulation δ(θ) that is dependent on a position θ is given thereto.

A wave form f[θ] of the phase modulated pattern of the signal track 233 may be given by an intensity modulation of below formulas (15) and (16) by assuming e.g. its amplitude as α (0<α<1):

[Formula 15]

$$f[\theta] = 1 + \alpha \sin\left[2\pi\frac{\theta}{\lambda} + \delta(\theta)\right] \quad (15)$$

[Formula 16]

$$\delta[\theta] = \beta \sin\left[2\pi\frac{\theta}{\Lambda}\right] \quad (16)$$

On the other hand, a waveform g[θ] of the pattern of the signal track 243 may be given by below formula (17) by assuming e.g. its amplitude as γ (0<γ<1):

[Formula 17]

$$g[\theta] = 1 + \gamma \sin\left[2\pi\frac{\theta}{\xi}\right] \quad (17)$$

In the formula (16), in a case where β=0, with the configuration of the vernier track, as shown in FIG. 13, the signal track 243 and the signal track 233 have periodic patterns in which the phases thereof match each other at every period ω. In these patterns, by extracting a phase of the waveform f[θ] and a phase of the waveform g[θ] and operating a difference therebetween, a signal with long period as below formula (18) is acquired. Note that the above operation including the below operations is performed by the operating unit 206.

[Formula 18]

$$2\pi\frac{\theta}{\xi} - 2\pi\frac{\theta}{\lambda} = 2\pi\frac{\xi-\lambda}{\xi\cdot\lambda}\theta = 2\pi\frac{j}{\Lambda}\theta = 2\pi\frac{\theta}{\omega} \quad (18)$$

Further, as stated above, an encoder having the signal track 243 corresponding to the main track and the signal track 233 corresponding to the sub track and that extracts the long period signal from the difference in electric angles of the signal track 243 and the signal track 233 is called the vernier type encoder.

Figure 15:
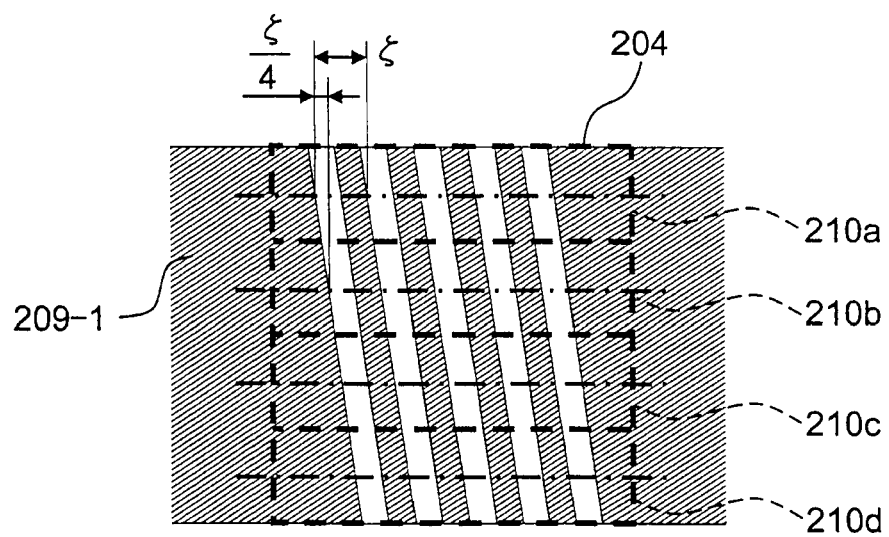
FIG. 15 is a linearly exploded view of detection slits of the optical encoder in the tenth embodiment of the present invention.
Figure 16:
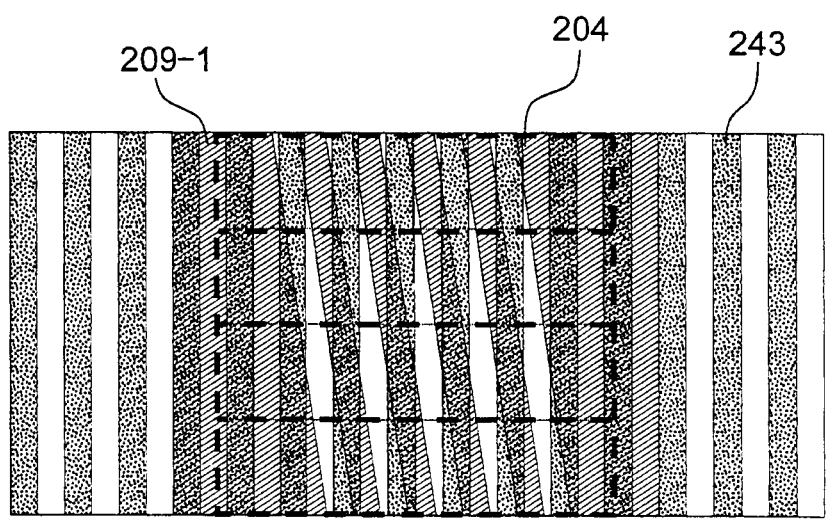
FIG. 16 is a linearly exploded view for showing a performance of the detection slit of the optical encoder in the tenth embodiment of the present invention.

The aforementioned extraction of the phases can be realized by the detection slits 209 of the fixed scale 207 described with reference to FIG. 10, using a detection slit pattern 209-1 as shown e.g. in FIG. 15. The detection slit pattern 209-1 has the identical period ξ as the signal track 243, and is formed inclining with respect to the slits of the signal track 243. Regions 210a to 210d surrounded by broken lines in the drawings indicate divided regions of the optical detecting part 204; and the optical detector 204a of the optical detecting part 204 (FIG. 11) is configured to output an integrated value of the incident light of the divided regions 210a to 210d. The inclination of each slit in the detection slits pattern 209 is determined to shift by one-fourth of a period on an average between the adjacent divided regions. In this configuration, the outputs from the respective divided regions 210a to 210d from the optical detector 204a are, as shown in FIG. 16, an amount of penetrating light through an overlap with the signal track 243, and become sine waves having their phase offset by π/2 as in below formulas (19) to (22):

[Formula 19]

$$g_1[\theta] = 1 + \gamma\sin\left[2\pi\frac{\theta+\theta_1}{\xi}\right] \quad (19)$$

[Formula 20]

$$g_2[\theta] = 1 + \gamma\cos\left[2\pi\frac{\theta+\theta_1}{\xi}\right] \quad (20)$$

[Formula 21]

$$g_3[\theta] = 1 - \gamma\sin\left[2\pi\frac{\theta+\theta_1}{\xi}\right] \quad (21)$$

[Formula 22]

$$g_4[\theta] = 1 - \gamma\cos\left[2\pi\frac{\theta+\theta_1}{\xi}\right] \quad (22)$$

Each of the above formulas (19) to (22) is further operated as shown below formula (23), and a tangent is calculated; and the phase can be taken, i.e., extracted, by the arctangent operation. However, the θ1 in the formulas (19) to (22) is a fixed initial phase, and is a positional displacement of the optical detector 204a with respect to a mechanical angle origin.

[Formula 23]

$$\frac{g_1[\theta] - g_3[\theta]}{g_2[\theta] - g_4[\theta]} = \tan\left[2\pi\frac{\theta+\theta_1}{\xi}\right] \quad (23)$$

Figure 14:
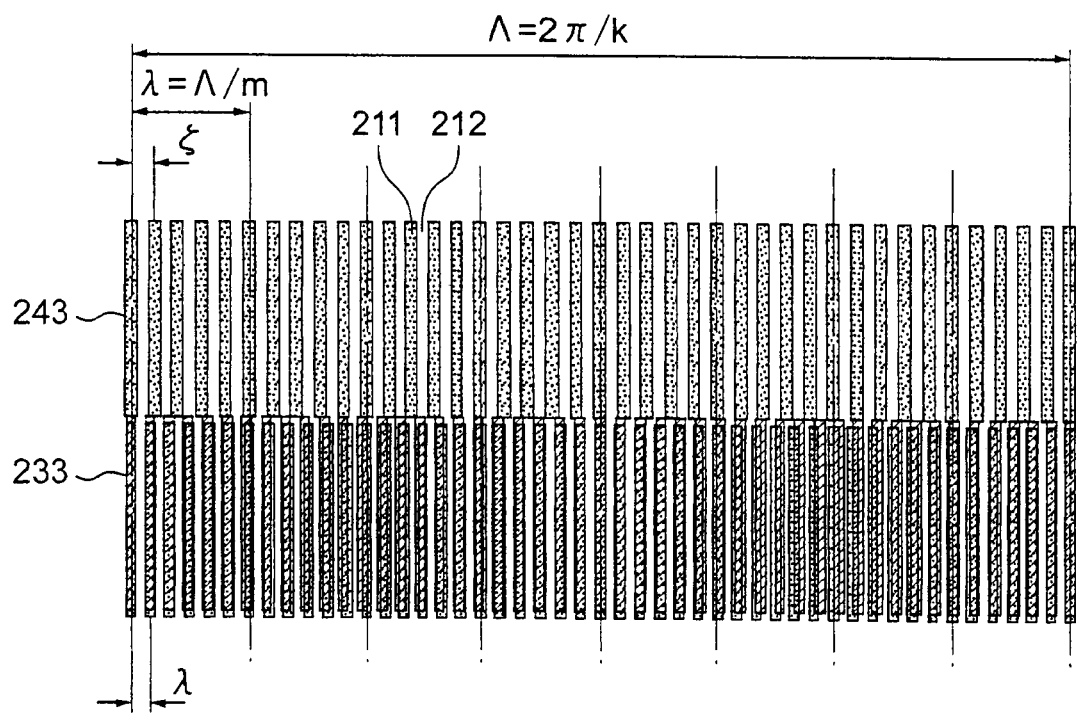
FIG. 14 is a linearly exploded view of the signal track of the optical encoder in the tenth embodiment of the present invention.

In the signal track 233 of the present tenth embodiment, β is β≠0, and in this case, the slit pattern in the signal track 233 is as the hatched pattern shown in FIG. 14. In FIG. 14, the pattern in the case of β=0 shown in FIG. 13 is overlappingly indicated. The pattern of β≠0 is a slit pattern having a phase displacement relative to the aforementioned case of β=0.

With respect to the aforementioned slit pattern of the signal track 233, a detection slit pattern that is similar to the detection slit pattern 209-1 may be arranged, and the penetrating light from the light source 101 can be received by the optical detector pairs 104a-104d (FIG. 11) configuring the optical detecting part 104. Then, based on the signals from the respective optical detector pairs 104a-104d, the respective phase angles (electric angles) are outputted by the operation process by the operating unit 206. Each of the optical detector pairs 104a-104d are arranged such that their positional displacement equals to Λ/4. When output phases of the optical detector pairs 104a-104d are assumed as Ψ1, Ψ2, Ψ3, Ψ4 respectively, they are expressed by below formulas (24) to (27):

[Formula 24]

$$\psi_1[\theta] = 2\pi\frac{\theta+\theta_2}{p_2} + \delta(\theta+\theta_3) \quad (24)$$

[Formula 25]

$$\psi_2[\theta] = 2\pi\frac{\theta+\theta_2}{p_2} + 2\pi\frac{\Lambda}{4p_2} + \delta(\theta+\theta_3+\Lambda/4) \quad (25)$$

[Formula 26]

$$\psi_3[\theta] = \frac{\theta+\theta_2}{p_2} + \pi + \delta(\theta+\theta_3+\pi/4) \quad (26)$$

[Formula 27]

$$\psi_4[\theta] = \frac{\theta+\theta_2}{p_2} + 3\pi/2 + \delta(\theta+\theta_3+\pi/4) \quad (27)$$

Similar to the formula (23) above, regarding the formulas (24) to (27), which are the detected phases of the light that has passed through the signal track 233 and the detection slit pattern, phase differences φ, φ2, φ3, φ4 with respect to the signal track 243 are operated, angle outputs as in below formulas (28) to (31) are acquired:

[Formula 28]

$$\phi_1[\theta] = 2\pi\frac{m}{\Lambda}\theta + 2\pi\left(\frac{\theta_1}{p_1} - \frac{\theta_2}{p_2}\right) + \delta(\theta+\theta_3) \quad (28)$$

[Formula 29]

$$\phi_2[\theta] = 2\pi\frac{m}{\Lambda}\theta + 2\pi\left(\frac{\theta_1}{p_1} - \frac{\theta_2}{p_2}\right) - 2\pi\frac{m}{4} + \delta(\theta+\theta_3+\Lambda/4) \quad (29)$$

[Formula 30]

$$\phi_3[\theta] = 2\pi\frac{m}{\Lambda}\theta + 2\pi\left(\frac{\theta_1}{p_1} - \frac{\theta_2}{p_2}\right) - 2\pi\frac{2m}{4} + \delta(\theta + \theta_3 + 2\Lambda/4) \quad (30)$$

[Formula 31]

$$\phi_4[\theta] = 2\pi\frac{m}{\Lambda}\theta + 2\pi\left(\frac{\theta_1}{p_1} - \frac{\theta_2}{p_2}\right) - 2\pi\frac{3m}{4} + \delta(\theta + \theta_3 + 3\Lambda/4) \quad (31)$$

A difference between φ1[θ] and φ2[θ] that respectively are the angular outputs of the optical detector pair 104a and the optical detector pair 104c, which are positionally displaced by Λ/2, is operated by the operating unit 206, and below formula (32) is thereby obtained:

[Formula 32]

$$\phi_1[\theta] - \phi_3[\theta] = 2\pi\frac{m}{2} + \delta(\theta + \theta_3) - \delta(\theta + \theta_3 + \Lambda/2) \quad (32)$$

$$= 2\pi\frac{m}{2} + \beta\sin\left[2\pi\frac{\theta + \theta_3}{\Lambda}\right] - \beta\sin\left[2\pi\frac{\theta + \theta_3 + \Lambda/2}{\Lambda}\right]$$

$$= 2\pi\frac{m}{2} + 2\beta\sin\left[2\pi\frac{\theta + \theta_3}{\Lambda}\right]$$

Similarly, a difference between φ2[θ] and φ4[θ] that respectively are the angular outputs of the optical detecting part 104a and the optical detecting part 104c, which are positionally displaced by Λ/2, is operated, and below formula (33) is thereby obtained:

[Formula 33]

$$\phi_2[\theta] - \phi_4[\theta] = 2\pi\frac{m}{2} + \delta(\theta + \theta_3 + \Lambda/4) - \delta(\theta + \theta_3 + 3\Lambda/4) \quad (33)$$

$$= 2\pi\frac{m}{2} + \beta\sin\left[2\pi\frac{\theta + \theta_3 + \Lambda/4}{\Lambda}\right] -$$

$$\beta\sin\left[2\pi\frac{\theta + \theta_3 + 3\Lambda/4}{\Lambda}\right]$$

$$= 2\pi\frac{m}{2} + 2\beta\cos\left[2\pi\frac{\theta + \theta_3}{\Lambda}\right]$$

From the above formula (32) and formula (33), the phase-modulated components that are superimposed in the signal track 233 are extracted. Further, in the operating unit 206, by removing a fixed phase, performing a division, and also performing an arctangent operation, the electric angle in a superimposed waveform that is superimposed in the signal track 233 can be acquired.

On the other hand, by respectively operating a sum of the angular output φ1[θ] of the optical detector pair 104a and the angular output φ1[θ] of the optical detector pair 104c and a sum of the angular output φ2[θ] of the optical detector pair 104b and the angular output φ4[θ] of the optical detector pair 104d, below formula (35) and formula (36) are obtained:

[Formula 34]

$$\phi_1[\theta] + \phi_3[\theta] = 2\pi\frac{2m}{\Lambda}\theta + 4\pi\left(\frac{\theta_1}{p_1} - \frac{\theta_2}{p_2}\right) - 2\pi\frac{m}{2} \quad (34)$$

[Formula 35]

$$\phi_2[\theta] + \phi_4[\theta] = 2\pi\frac{2m}{\Lambda}\theta + 4\pi\left(\frac{\theta_1}{p_1} - \frac{\theta_2}{p_2}\right) - 2\pi m \quad (35)$$

The operation outputs of the formulas (34) and (35) are operational outputs of the vernier detection of the formula (18), and are outputs that are repeated for j times within the period Λ. On the other hand, the phase-modulated waves indicated by the formulas (32) and (33) are waveforms that are outputted only one time within the period Λ. Hence, by utilizing the outputs of the electric angles of the phase-modulated waves as indicated by the formulas (32) and (33), positions for repetition of j times in the vernier detection indicated by the formulas (34) and (35) can be specified. Further, according to the electric angles of the vernier detection indicated by the formulas (34) and (35), positions of the n times repeated waveform in the signal track 243 can be specified. Absolute position detection with high precision is thereby enabled.

That is, in the sine wave angle interpolation optical encoder of the present tenth embodiment, in a single period of sine wave, the interpolation angle precision of a single signal track can be improved beyond a limitation of the interpolation precision that is caused by the signal detection circuit.

Further, in the present tenth embodiment also, the case with a rotary encoder has been taken as the example, however, as are clear from FIGS. 13 and 14, the present invention may similarly be applied to the configuration of a linear encoder.

Further, in the present tenth embodiment, the phase-modulated wave δ(θ) is assumed as the sine wave, however, as long as a function satisfies δ(θ+Λ/2)=−δ(θ), the phase-modulated wave and the fundamental wave can be separated.

Further, in the present tenth embodiment also, the explanation is given based on a penetrating-type optical system in which the scale is interposed between the light source and the optical detecting part, however, it is apparent that an identical operation can be performed in a reflecting-type optical system in which the light source and the optical detecting part may be arranged on one, same side with respect to the scale, and the scale is used as a reflecting plate.

Yet further in the present tenth embodiment, the period λ of the signal track 233 has the fundamental period having the wavenumber L that is less than the wavenumber n of the signal track 243 by the number j, and the phase modulation δ(θ) that is dependent on the position θ is given thereto. However, the present embodiment is not limited to this, and as in the ninth embodiment, the period of the signal track 233 may have a fundamental period with a wavenumber h that is greater than the wavenumber n of the signal track 243 by the number j. The effect that can be achieved in such a case is the same as that of the ninth embodiment.

Eleventh Embodiment

Figure 17:
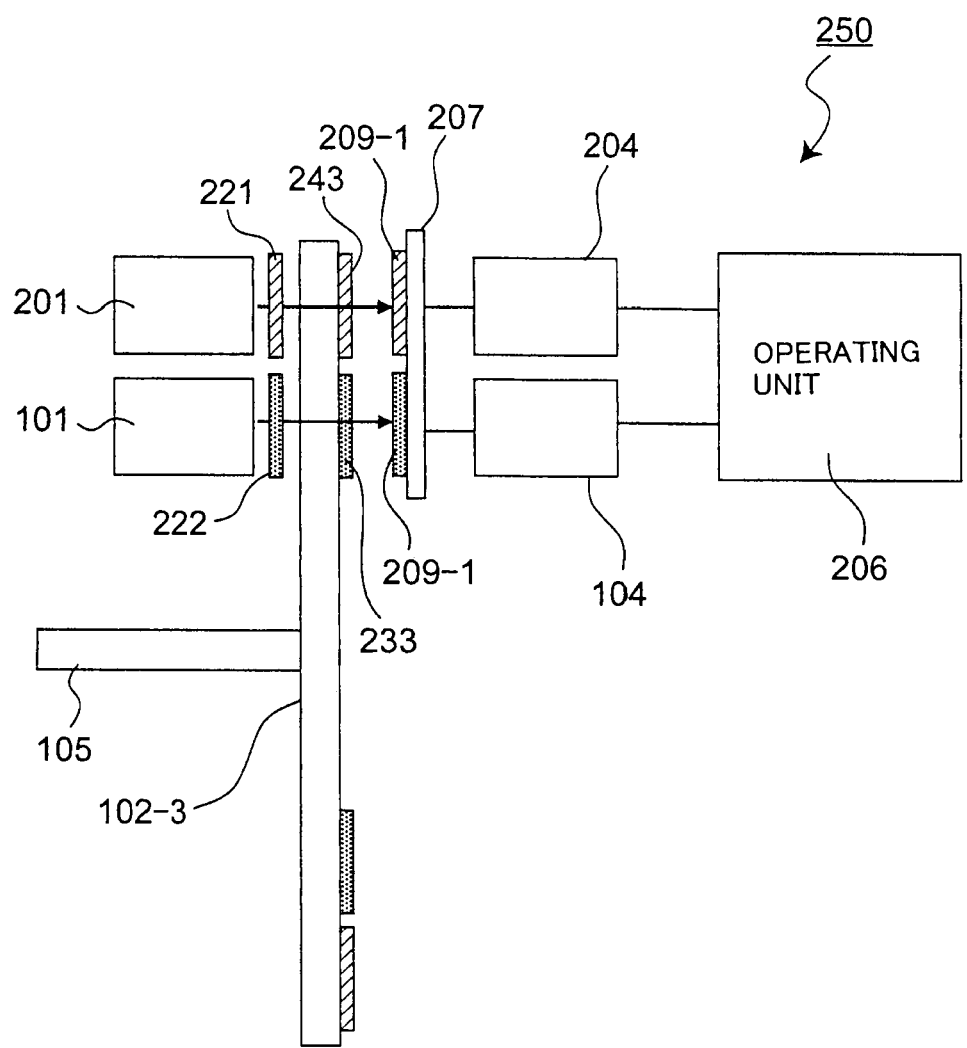
FIG. 17 is a configuration diagram of an optical encoder in an eleventh embodiment of the present invention.

In the optical encoder of the tenth embodiment, the configuration in which the patterns of the signal tracks 243 and 233 formed on the scale 102-1 are projected to the detection slits 209-1, 209-1 of the fixed scale 207 is exemplified. However, a configuration as an optical encoder 250 of the present eleventh embodiment as shown in FIG. 17 may alternately be employed.

That is, on a side of light sources 101, 201, i.e., between light sources 101, 201 and a scale 102-3, first gratings 221, 222 are fixedly arranged. It may be configured such that light from each of the light sources 101, 201 passes through the first gratings 221, 222, through the signal tracks 243, 233, then through the detection slit patterns 209-1, 209-1, and finally reaches the optical detecting parts 204, 104. This configuration may further be configured such that grating images of the first gratings 221, 222 by the slit patterns of the signal tracks 243, 233 are formed on the detection slit patterns 209-1, 209-1, which are the third gratings. Such a configuration is called the three gratings system or a grating imaging method. Even in a case employing this optical configuration, operation and effect of the optical encoder of the tenth embodiment may also be realized.

In the optical encoder 250 of the present eleventh embodiment, respective grating pitches of the first gratings 221, 222 and the detection slit patterns 209-1, 209-1 are selected based on an imaging relationship obtained by a gap between the scale 102-3 and the first gratings 221, 222 and a gap between the scale 102-3 and the detection slit patterns 209-1, 209-1. Hence, according to the optical encoder 250 of the present eleventh embodiment, by making the pitches of the respective gratings to be substantially identical, the margin in the gaps can be improved without having to increase the sensitivity of displacement. In other words, detection with larger gaps and high resolution is thereby enabled.

Further, in the slit patterns of the signal tracks 243, 233 in this system, a phase grating that gives periodic phase modulation to light can be used. By configuring the scale with the phase grating, efficiency in the use of light can be improved compared to an amplitude grating.

Further, similar to the tenth embodiment, employment of a linear encoder and a reflecting type configuration is also possible in the present eleventh embodiment.

Note that, by voluntarily combining the embodiments among the various embodiments as stated above, effects possessed by the combined embodiments can also be achieved.

The present invention has been described in detail with reference to the attached drawings in relation to the preferred embodiments, and various changes and modifications are apparent to those skilled in the art. It should be construed that such changes and modifications are, so long as they do not go beyond a scope of the present invention recited in the claims attached herewith, included within the scope thereof.

Further, entireties of the contents disclosed in the specification, drawings and claims of a Japanese Patent Application No. 2008-148063, filed on Jun. 5, 2008, and a Japanese Patent Application No. 2008-294189, filed on Nov. 18, 2008 are hereby incorporated by reference into the present specification.

DESCRIPTION ON REFERENCE NUMBERS

100 optical encoder, 101 light source,
102, 102-2, 102-3 scale, 103 signal track,
104 optical detecting part, 105 rotating shaft,
106 operating unit, 107 to 114 optical detector,
200 optical encoder, 201 light source,
203 signal track, 204 optical detecting part,
206 operating unit, 233 signal track,
243 signal track, 250 optical encoder.

The invention claimed is:

1. An optical encoder comprising:
a light source;
a single signal track arranged on a subject of measurement and configured to modulate a luminous flux from the light source in accordance with a movement of the subject of measurement;
an optical detecting part configured to receive the luminous flux from the signal track and convert the luminous flux to an electrical signal, and output the electrical signal; and
an operating unit configured to operate on the output signal of an optical detector;
the signal track including a configuration configured to sinusoidally modulate an intensity of the light from the light source and give the sine-wave a phase modulation which is repeated for every $m\lambda=\Lambda$ (the m being a natural number), where the $\lambda$ being a fundamental period,
the optical detecting part extracting a sine signal and a cosine signal from the luminous flux modulated sinusoidally by the signal track giving the phase modulation, and
wherein by the operating unit, signals with two periods from the single signal track are obtained, one of which is a fundamental period signal with the fundamental period $\lambda$ and the other is a phase-modulated signal with the period $\Lambda$.

2. The optical encoder according to claim 1, wherein
the optical detecting part is configured to arrange a first optical detector pair and a second optical detector pair at respective positions that are apart by a period of $\{(2n+1)\Lambda/2\}$ in the period $\Lambda$ of the phase modulation, the first optical detector pair includes a pair of optical detectors configured to extract the sine signal and the cosine signal from the luminous flux modulated sinusoidally by the signal track, and the second optical detector pair includes a pair of optical detectors configured to extract the sine signal and the cosine signal from the luminous flux modulated sinusoidally by the signal track,
the operating unit is configured to obtain an electric angle at a position of each of the first optical detector pair and the second optical detector pair from the sine signals and the cosine signals outputted from the first optical detector pair and the second optical detector pair, obtain an electric angle in the fundamental period $\lambda$ by adding each of the obtained electric angles, and obtain a first phase-modulated signal by determining a difference between the obtained electric angles.

3. The optical encoder according to claim 1, wherein
the optical detecting part further includes a third optical detector pair and a fourth optical detector pair, which are positioned at respective positions that are apart by a period of $\{(2n+1)\Lambda/4\}$ from the first optical detector pair and the second optical detector pair respectively, and have the same configuration as the first optical detector pair and the second optical detector pair,
the operating unit is configured to obtain an electric angle of the phase-modulated signal from the first phase-modulated signal that is obtained from the first optical detector pair and the second optical detector pair and a second phase-modulated signal that is obtained from the third optical detector pair and the fourth optical detector pair.

4. The optical encoder according to claim 1, wherein
the optical detecting part is configured to arrange a first optical detector pair and a second optical detector pair at respective positions that are apart by a period of $\Lambda/2$ in the period $\Lambda$ of the phase modulation, the first optical detector pair includes a pair of optical detectors configured to extract the sine signal and the cosine signal from the luminous flux modulated sinusoidally by the signal track, and the second optical detector pair includes a pair of optical detectors configured to extract the sine signal and the cosine signal from the luminous flux modulated sinusoidally by the signal track, and the optical detecting part is further configured to include a third optical detector pair and a fourth optical detector pair, which are positioned at respective positions that are apart by a period of $\Lambda/4$ from the first optical detector pair and the second optical detector pair respectively, and have the same configuration as the first optical detector pair and the second optical detector pair, the operating unit is configured to obtain an electric angle of a position of each optical detector pair from the sine signal and the cosine signal outputted respectively from the first optical detector pair and the second optical detector pair as well as the third optical detector pair and the fourth optical detector pair, obtain an electric angle of the fundamental period $\lambda$ by adding each of the acquired electric angles, and obtain a first phase-modulated signal by determining differences between the respective acquired electric angles.

5. The optical encoder according to claim 2, wherein the operating unit is configured to obtain an electric angle of a phase-modulated signal based on a difference between the first phase-modulated signal and a second phase-modulated signal, where the first phase-modulated signal is obtained from the first optical detector pair and the second optical detector pair as well as a third optical detector pair and a fourth optical detector pair, and the second phase-modulated signal is obtained from the second optical detector pair and the third optical detector pair as well as the fourth optical detector pair and the first optical detector pair.

6. The optical encoder according to claim 1, wherein the subject of measurement includes, in addition to a first signal track which is the signal track, a second signal track that is different from the first signal track, the optical detecting part is arranged so as to correspond to each signal track, the first signal track is a signal track that generates the phase-modulated sine wave, the second signal track is a signal track that performs the sinusoidal light intensity modulation of a single period having a higher frequency than a resolution that can be processed by the first signal track.

7. The optical encoder according to claim 1, wherein the subject of measurement includes, in addition to a first signal track which is the signal track, a second signal track that is different from the first signal track, the optical detecting part is arranged so as to correspond to each signal track, the first signal track is a signal track that generates the phase-modulated sine wave, the second signal track is a signal track that performs the sinusoidal light intensity modulation of a single period having a lower frequency than a resolution that can be processed by the first signal track.

8. The optical encoder according to claim 6, wherein the second signal track is a signal track that performs the sinusoidal light intensity modulation of a single period, where a wavenumber n of the second signal track differs by a number j from a wavenumber L of the first signal track.

9. The optical encoder according to claim 8, wherein a track radius of the first signal track is R(L/n), where a track radius of the second signal track is R.

* * * * *